United States Patent
Ferchichi et al.

(10) Patent No.: US 9,148,420 B2
(45) Date of Patent: *Sep. 29, 2015

(54) SINGLE SIGN-ON PROCESS

(71) Applicant: Swisscom AG, Bern (CH)

(72) Inventors: Azim Ferchichi, Vevey (CH); Eric Lauper, Bern (CH)

(73) Assignee: SWISSCOM AG (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/445,539

(22) Filed: Jul. 29, 2014

(65) Prior Publication Data
US 2015/0089618 A1 Mar. 26, 2015

Related U.S. Application Data

(63) Continuation of application No. 11/226,724, filed on Sep. 14, 2005, now Pat. No. 8,793,779, which is a continuation of application No. 10/207,513, filed on Jul. 29, 2002, now Pat. No. 7,058,180, which is a (Continued)

(51) Int. Cl.
*G06F 7/04* (2006.01)
*G06F 21/41* (2013.01)
(Continued)

(52) U.S. Cl.
CPC ............ *H04L 63/0815* (2013.01); *G06F 21/34* (2013.01); *G06F 21/41* (2013.01); *H04L 63/062* (2013.01); *H04L 63/08* (2013.01); *H04L 67/04* (2013.01); *H04L 67/14* (2013.01);
(Continued)

(58) Field of Classification Search
None
See application file for complete search history.

(56) References Cited

U.S. PATENT DOCUMENTS

| 5,153,919 A | 10/1992 | Reeds, III et al. |
| 5,778,071 A | 7/1998 | Caputo et al. |

(Continued)

FOREIGN PATENT DOCUMENTS

| EP | 0957651 | 11/1999 |
| WO | 9832301 | 7/1998 |

OTHER PUBLICATIONS

Menezes, Van Oorschot, Vanstone: "Handbook of Applied Cryptography" 1997, CRC Press, Boca Raton, Florida 33431, USA XP002153614, ISBN: 0-8493-8523-7 p. 506-508.

(Continued)

*Primary Examiner* — Kaveh Abrishamkar
(74) *Attorney, Agent, or Firm* — McAndrews, Held & Malloy, Ltd.

(57) ABSTRACT

Methods and systems are provided for single sign-on process for remote-access to remote servers, using user equipment associated with a user. An intermediate device (e.g., smart-card) associated with the user equipment may be activated using local-access authentication information provided by the user. The local-access authentication data may be provided by the user in response to requests by the user equipment. Once activated, the intermediate device may support remote-access operations, by providing, in response to authentication requests received from remote servers, remote-access authentication data, which may be used in authenticating the user at the remote servers. The authentication requests may be sent by the remote server to the user equipment in response to the user requesting remote access. The remote-access authentication data may be provided without requiring user input, once the intermediate device is activated. Further, the remote-access authentication data is different from the local-access authentication data.

30 Claims, 16 Drawing Sheets

Related U.S. Application Data continuation of application No. PCT/CH00/00438, filed on Aug. 16, 2000.

(60) Provisional application No. 60/181,090, filed on Feb. 8, 2000.

(51) Int. Cl.

| | | |
|---|---|---|
| *G06F 21/34* | (2013.01) | |
| *H04L 29/06* | (2006.01) | |
| *H04W 8/26* | (2009.01) | |
| *H04W 12/04* | (2009.01) | |
| *H04W 12/06* | (2009.01) | |
| *H04L 29/08* | (2006.01) | |
| *H04W 12/02* | (2009.01) | |

(52) U.S. Cl.
CPC ............ *H04W 8/265* (2013.01); *H04W 12/04* (2013.01); *H04W 12/06* (2013.01); *H04L 63/0442* (2013.01); *H04L 63/0853* (2013.01); *H04L 63/164* (2013.01); *H04W 12/02* (2013.01)

(56) References Cited

U.S. PATENT DOCUMENTS

| | | |
|---|---|---|
| 5,898,780 A | 4/1999 | Liu et al. |
| 5,983,350 A | 11/1999 | Minear et al. |
| 6,957,338 B1 | 10/2005 | Sumino |
| 7,010,582 B1 | 3/2006 | Cheng et al. |
| 7,058,180 B2 * | 6/2006 | Ferchichi et al. ............. 380/247 |
| 7,441,043 B1 | 10/2008 | Henry et al. |
| 8,793,779 B2 * | 7/2014 | Ferchichi et al. ................. 726/8 |
| 2001/0028636 A1 | 10/2001 | Skog et al. |

OTHER PUBLICATIONS

Inoue, A. et al: IP Layer Security and Mobility Support Design Policy and an Implementation Global Network Evolution: Convergence or Collision?, Toronto, Sep. 21-26, 1997, Toronto, Pinnacle Group, CA, Sep. 21, 1997, p. 571-577, xPOOOn0565.

Schultz, E E: "Windows NT Security: Kodos, Concerns and Prescriptions" Computers & Security. International Journal Devoted to the Study of Technical and Financial Aspects of Computer Security, NL, Elsevier Science Publishers. Amsterdam, vol. 18, No. 3, 1999, p. 204-210. XP004164021, ISSN: 0167-4048.

Berniato, Scott; "Gem plus Has a Smart Suite," PC Week. Jun. 15, 1998, pp. 37-38.

Microsoft Technet; "Single Sign-On in Window 2000 Networks," pp. 1-12.

GemSafe White Paper: "Understanding the Fundamentals of Smart Card Enabled Security for Web and E-mail," Dec. 22, 1998 pp. 1-22.

* cited by examiner

SINGLE SIGN-ON PROCESS

CLAIM OF PRIORITY

This application is a continuation of U.S. patent application Ser. No. 11/226,724, filed Sep. 14, 2005, which in turn is a continuation of U.S. patent application Ser. No. 10/207,513, filed Jul. 29, 2002 as a continuation of International (PCT) Patent Application No PCT/CH00/00438 (W00160013), filed 5 Aug. 16, 2000, which claims priority from U.S. Provisional Patent Application No. 60/181,090, filed Feb. 8, 2000. Each of above stated applications is hereby incorporated herein by reference in its entirety.

FIELD OF THE INVENTION

The invention concerns a single sign-on process and a smart-card used for said single sign-on process. The present invention also concerns a process for changing a secret from a plurality of equipment in a network.

DESCRIPTION OF RELATED ART

When users remote-access a corporate network or a private LAN, various communication layers have to be built-up. Generally, each layer requires an authentication. For each authentication, the users may enter secrets, for example a PIN, a password, a passphrase or biometrics data. This leads to two problems. The more secrets the users have to remember, the more they tend to choose easy secrets and the more they tend to write them down. In addition, they also tend to forget them, which increases management costs.

One purpose of the invention is to use only one secret that serves for all authentications.

Single sign-on processes have already been proposed for users who want to log onto different machines, each having its own operating system and its own type of authentication. This type of known single log-on process only works once all necessary communication layers have already been built. More specifically it is generally assumed that machines are inside a corporate network with TCP/IP as the basic communication layer.

Another purpose of the invention is to provide a single sign-on process with an authentication that is not tied to machine log-on, but to layer construction. This means that each time a new layer has to be built-up, it may require a new authentication of the user or his/her machine.

Another purpose of the invention is to propose a single sign-on process that can be used for building a communication over different communication layers of different network protocols.

Known single sign-on systems are based on central servers on which the users make their first log-on. This approach is not practicable when the user does not have the required communication layers to contact the central authentication server. Another problem is that for each authentication required, we do not necessarily deal with the same company, and having one central server for all may lead to political and trust problems.

BRIEF SUMMARY OF THE INVENTION

In accordance with one embodiment of the present invention, those problems are solved with a process comprising the steps claimed in claim 1.

More specifically, those problems are solved with a single sign-on process allowing a mobile user with a mobile equipment to remote-access a remote location, comprising the steps of:

(1) sending a first authenticator over a first communication layer to a first intermediate equipment between said mobile equipment and said remote location, (2) verifying in said first intermediate equipment said first authenticator sent by said mobile equipment, (3) if said first authenticator is accepted by said first intermediate equipment, completing the communication layer between said mobile equipment and said intermediate equipment, (4) repeating steps (1) to (3) with a plurality of successive intermediate equipment and over a plurality of successive communication layers, until a communication has been completed at the last requested communication layer between said mobile equipment and said remote location, wherein at least a plurality of said authenticators are furnished by a smart-card in said mobile equipment.

According to an aspect of the invention, every step of the single sign-on process is carried out on the client side, preferably in a smart-card.

This process is advantageous in that it does not weaken any existing authentication mechanism already in place. Moreover, the use of a smart-card improves the overall security. No central single sign-on server is needed.

According to another aspect of the invention, one and only one password (or PIN, or biometric data, or any other secret) is entered by the user, e.g. by a mobile user, to remote-access an enterprise network, regardless of the number of authentications to be performed and regardless of the number of communication layers to be built up.

The inventive process allows for a transparent layer construction and transparent user or machine authentication at each layer. Layers can be transparently reconstructed in case of unintentional communication cutoff.

DETAILED DESCRIPTION OF POSSIBLE EMBODIMENTS OF THE INVENTION

Figure 1:
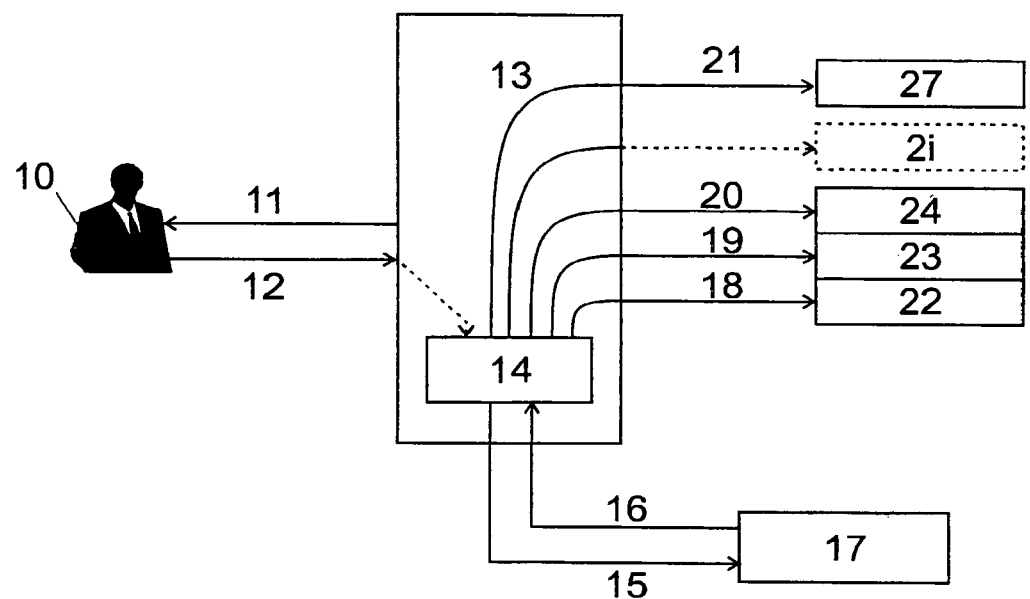
FIG. 1 shows the general concept of the inventive process.

FIG. 1 shows a schema illustrating the general concept of the invention. The reference number 13 shows a single sign-on module, which can include hardware and software parts. The single sign-on module can be realized as a software module running on a microprocessor in a mobile equipment of a user 10. It includes a smart-card interface 14 for interconnecting over an API interface with a smart-card 17. Reference numbers 22, 23, ..., 2i, ... 27 show superposed layers of a telecommunication protocol stack.

All process steps are initiated by the single sign-on module 13. When the user requests a remote access with his corporate network, the single sign-on module 13 launches the user interface (arrow 11) in order to prompt the user for his login name and secrets. This step may include displaying a dialog box on a graphical user interface on the display of the user equipment, a voice prompt, etc. The user 10 then enters his login name and passwords (arrow 12). The secrets may include a password, a passphrase, user biometrics data, etc.

The login name and the secrets entered are then checked in the single sign-on module 13 and compared with names and secrets stored in a protected memory area of the module 13 (not shown) to verify the user's authorization. If the test fails, the user may be requested to try again, until a predefined maximal number of tries has been reached. Otherwise, the smart-card 17 is activated (arrow 15) in order to retrieve the login information (arrow 16) needed for successively completing the communication layers 22-27 (arrows 18-21).

General Theoretical Description

We will now introduce a few definitions and theoretical concepts that will be needed in the following sections.

1—Classification of Authentication Mechanism 1.1—Definition

Figure 2:
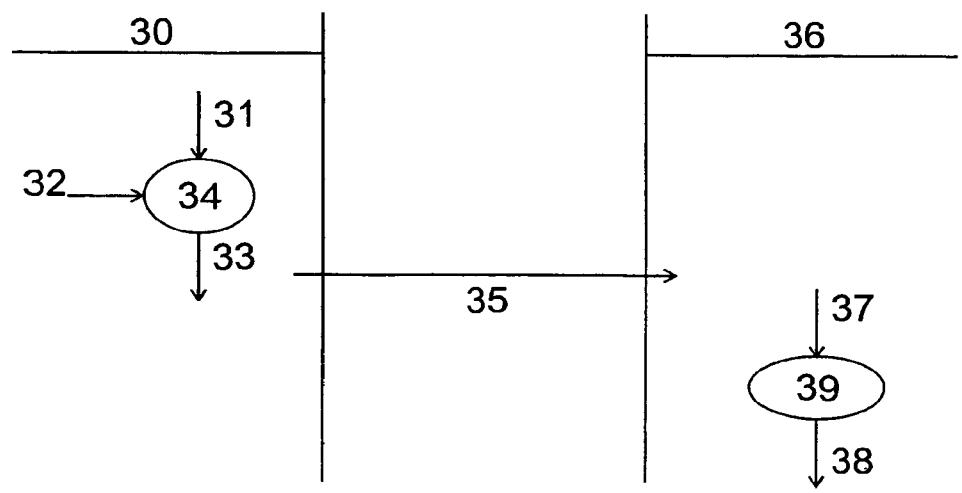
FIG. 2 illustrates the definition of an authenticator in an authentication scheme.

FIG. 2 shows a sender 30 and a receiver 36. The receiver 36 gives the sender access to the requested services only if an authenticator 37 received from the sender can be verified. The authenticator 33 sent by the sender is processed using processing means 34 from a secret 31 entered by the user, e.g. from a password, a passphrase, a PIN or biometrics data, and from other data 32, such as the user ID, the time, etc. The authenticator is defined as being the raw data that is received by the receiver 36 in an authentication scheme and that will be used to verify the identity of the sender 30. This authenticator is sent over a communication channel between the sender and the receiver (arrow 35) and verified in a verification process 39 by the receiver 36, in order to deliver an authentication result 38.

The verification process 39 and the receiver 36 can use different kinds of authenticators 37:

1.3—Clear-Text Authenticators

In this category, no processing is made to transform the secret 31 entered by the user 10 in a non-readable form. This implies that we can directly read the secret entered by the user by reading the authenticator.

1.3.1—Permanent Secret (Mechanism AUTH1)

In a first case of clear-text authentication mechanism, which will be denoted as the mechanism AUTH1, the same secret 31 included in the authenticator serves to perform many authentications. A typical example is remote login on most UNIX machines. The user always types the same password and the password is sent in clear text to the machine. This type of authentication is the weakest one.

1.3.2—One-Time Secret (Mechanism AUTH2)

In a second case (AUTH2), a new secret 31 is entered by the user 10 each time a new authentication is required. For example, the user can be provided with a list of passwords or PINs that he has to keep secret. The receiver 36 also has to have the same list. At each new authentication, the user takes the next password on the list and sends it in clear text to the receiver for verification.

Another known example is the so-called SecureID authentication process. In this case, the user 10 is provided with a token that display a new secret number each minute. At each authentication the user enters the new displayed number.

This type of authentication provides protection against replay attack. However, it shall be implemented in such a way that it shall not be possible to guess the next coming password or PIN, even if an attacker has all the previous ones.

1.4—Cryptographic Authenticators

In this category, the secret 31 entered by the user 10 is converted in a non-readable form using a cryptographic function.

1.5—Hashed Password (Mechanism AUTH 3)

Figure 3:
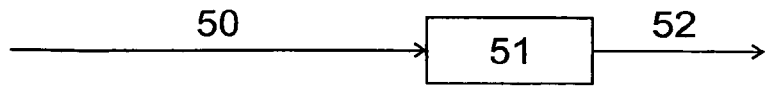
FIG. 3 illustrates a hashed authentication mechanism.

This category of cryptographic authentication mechanism is illustrated in FIG. 3. In this case, a one-way hash function 51 is used to transform the secret 50, together with some other data such as a replay attack protection, the user-ID, a sequence number or a random number, in an encrypted authenticator 52.

The hash function is an algorithm that takes a variable length input and produces a fixed length output. A hash function is considered a secure transformation function if it fulfils the following characteristics: the output is a fixed length string even if the input is a variable length string; they have to be one-way functions, i.e. given an output it is not possible to guess the input; they have to be collision-free, i.e. it is hard to generate two inputs that give the same output. These functions are generally referred to as one-way hash functions. Example of such functions are: Snefru, N-Hash, MD4 (Message Digest 4), MD5 (Message Digest 5), MD2 (Message Digest 2), SHA Secure Hash Algorithm), Ripe-MD, Haval, etc.

In this type of mechanism, the password as input is generally concatenated with other information, etc.

1.5.1 Symmetric Algorithms 1.5.1.1 Symmetric Algorithms without Key Protection (Mechanism AUTH4)

Figure 4:
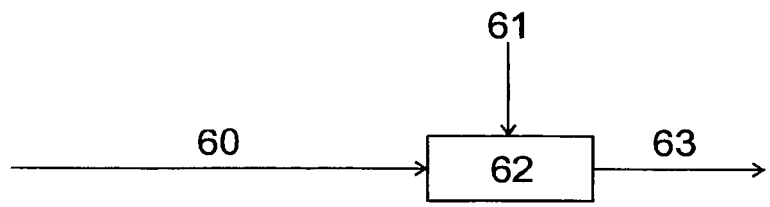
FIG. 4 illustrates a cryptographic authentication mechanism without key protection.

This case is illustrated in FIG. 4. In this case, a cryptographic function 62 is used with a key 61 to transform the data 60, including the user secret and a replay attack protection, such as a user-ID, a sequence number or a random number, in an encrypted authenticator 63.

In this scenario, the key 61 used by the cryptographic function 62 is only protected at operating system level. In other words, it means that the secret key is stored on the disk in clear text format, and its access is only protected by operating system access control. Hereafter, some examples of symmetric cryptographic functions: DES, Triple DES, IDEA, REDOC, MMB, etc.

1.5.1.2—Symmetric Algorithms with Weak Key Protection (Mechanism AUTH5)

Figure 5:
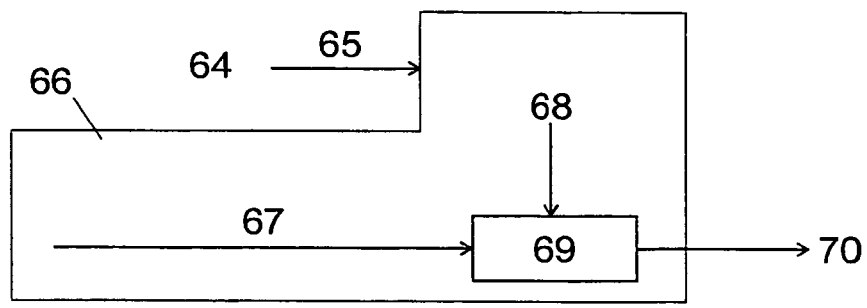
FIG. 5 illustrates a symmetric cryptographic authentication mechanism with weak key protection.

This case is illustrated in FIG. 5. In this case, a secret 64 must be entered by the user in order to get access (arrow 65) to an application or software 66 with which some data such as a replay attack protection, the user-ID, a sequence number or a random number, etc, can be encrypted by a symmetric cryptographic function 69 using a secret key 68. The function 69 computes an encrypted authenticator 70.

It gives a weak protection, because the secret key 68 can still be accessed at operating system level, since it is stored on the disk in clear-text form.

1.5.1.3—Symmetric Algorithms with Strong Key Protection (Mechanism AUTH6)

Figure 6:
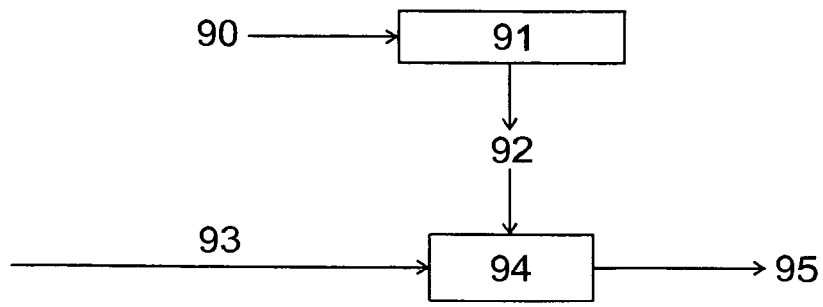
FIG. 6 illustrates a symmetric cryptographic authentication mechanism with strong key protection.

This case is illustrated in FIG. 6. In this scenario, the secret key 92 is directly derived from the secret 90 (PIN/password) entered by the user, using a secure transformation function 91. This key is used by a symmetric cryptographic function 94 to compute the encrypted authenticator 95 from the replay attack protection data 93. Thus, the secret key 92 is never stored on the client hard-disk. These secure transformation functions are the same as the one-way hash functions described above and have the same characteristics.

1.5.2 Asymmetric Algorithms 1.5.2.1 Asymmetric Algorithms without Key Protection (Mechanism AUTH7)

The scenario is the same as the one described in §3.1.5.1.1 in connection with symmetric algorithms without key protection, except that the secret key has to be replaced by the private key.

Example of asymmetric algorithms include RSA (Rivest Shamir Adleman), ECC (Elliptic Curve Crypto-system), El-Gamal, DSA, ESIGN, etc.

1.5.2.2—Asymmetric Algorithms with Weak Key Protection (Mechanism AUTH8)

The scenario is the same as the one described in §3.1.5.1.2 in connection with symmetric algorithms with weak key protection, except that the secret key has to be replaced by the private key.

1.5.2.3—Asymmetric Algorithms with Strong Key Protection (Mechanism AUTH9)

Figure 7:
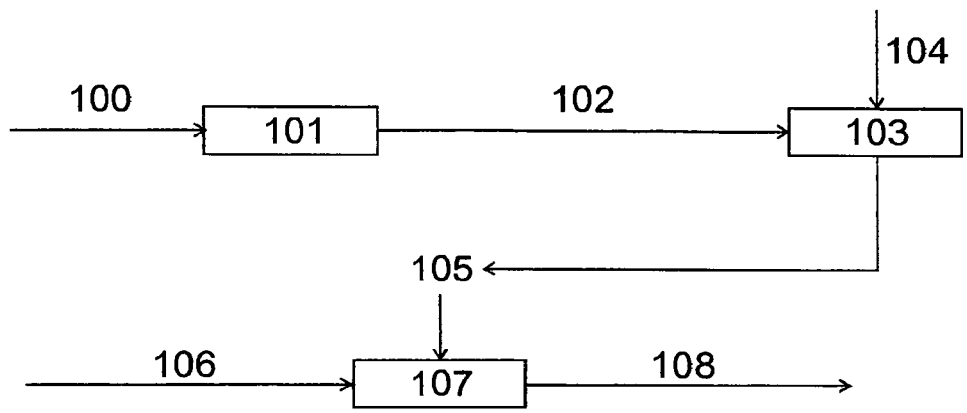
FIG. 7 illustrates an asymmetric cryptographic authentication mechanism with strong key protection.

This case is illustrated in FIG. 7. In this scenario, the private key 105 used by the asymmetric cryptographic function 107 to calculate the authenticator 108 from the data 106 is itself protected. It is stored in an encrypted form on the client hard disk. To decrypt it, a password/PIN 100 has to be entered. A secret key 102 is derived from this password 100 with a secure transformation function 101; this secret key 102 is used by the symmetric decryption module 103 to decrypt the private key 104. The secure transformation function is a one-way hash function.

2—Integration of Authentication Mechanisms with the Smart-Card 2.1—Authentication Data and Authentication Functions We will now describe, for each authentication type described above, what authentication data will be stored in the smart-card 17 of the invention, and what authentication functions need to be implemented in the single sign-on module 13.

Most of the time the AUTH2 type of mechanisms are working with external and standalone devices (either a token displaying the PIN/password or a paper sheet on which the PIN/passwords are written down), and it is often undesired to implement them on a smart-card. For this reason, this type of mechanisms will not be described any further in this document.

2.2—Authentication Mechanism Using the Smart-Card

Figure 8:
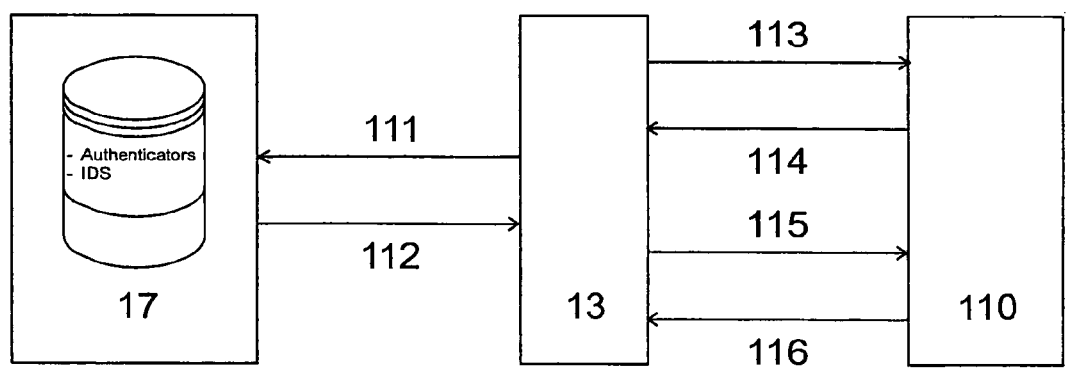
FIG. 8 illustrates an authentication process for a permanent secret authentication mechanism.

FIG. 8 shows the authentication process for type AUTH1 authentication (Clear-text authenticator). In this case, the smart-card 17 just serves as a secure repository for authenticators. When the single sign-on module requests a login from an authentication server 110 of the type AUTH1 (arrow 113), the latter replies by requesting an authenticator, usually a PIN or a password (arrow 114). The single sign-on module 13 requests this authenticator from the smart-card (arrow 111). If the latter is in active state, it sends the authenticator to the module 13 (arrow 112), possibly with other data. This authenticator is transmitted with other data to the server 110 (arrow 115); if the authenticator is verified, it sends the authentication results to the single sign-on module 13 (arrow 116).

Figure 9:
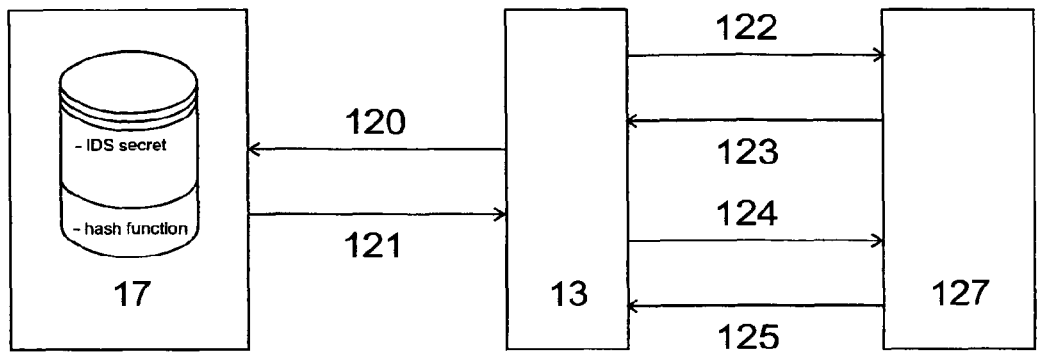
FIG. 9 illustrates the authentication process for a hashed password authentication mechanism.

FIG. 9 shows the authentication process for AUTH3 type authentication (Cryptographic authenticator). In this case, the smart-card 17 is used to securely store the secret and to calculate the hash value derived from the stored secret. When the single sign-on module requests a login from an authentication server 127 of the type AUTH3 (arrow 122), the latter replies by requesting an authenticator, usually the hash value of a PIN or password (arrow 123). The single sign-on module 13 requests this authenticator from the smart-card (arrow 120). If the latter is in active state, it computes the authenticator from the user password and possibly from other data and sends it to the module 13 (arrow 121), which sends it to the server 127 (arrow 124); if the authenticator is verified, the server 127 sends the authentication results to the single sign-on module 13 (arrow 125).

Figure 10:
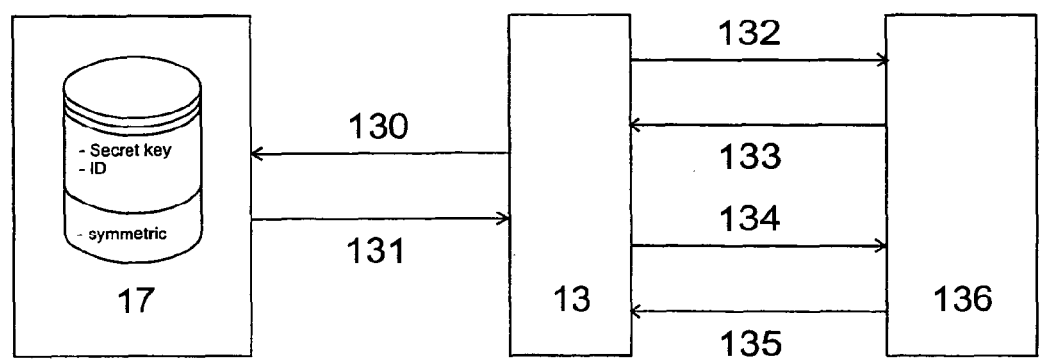
FIG. 10 illustrates an authentication process for a symmetric authentication mechanism without key protection or with weak key protection.

FIG. 10 shows the authentication process for AUTH4 (symmetric algorithms without key protection) and AUTH5 (symmetric algorithms with weak key protection) type authentication. In this case the smart-card 17 securely stores the secret key.

When the single sign-on module 13 requests a login from an authentication server 136 of the type AUTH4 or AUTH5 (arrow 132), the latter replies by requesting an authenticator (arrow 133). The single sign-on module 13 sends the data for authentication to the smart-card (arrow 130). If the latter is in active state, it encrypts the data using symmetric algorithm with the secret key to produce the authenticator which is sent to the single sign-on module (arrow 131) that forwards it (arrow 134) to the authentication server 136 for verification; if the authenticator is verified, the server 136 sends the authentication results to the single sign-on module 13 (arrow 135).

Figure 11:
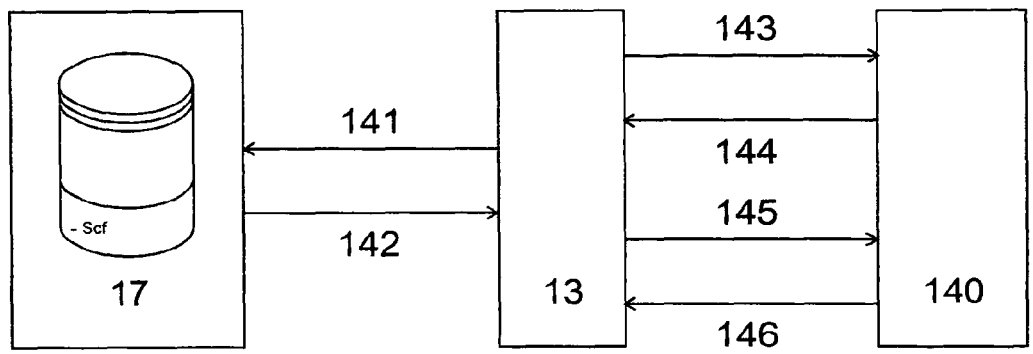
FIG. 11 illustrates an authentication process for a symmetric authentication mechanism with strong key protection.

FIG. 11 shows the authentication process for AUTH6 type authentication (Symmetric algorithms with strong key protection). In this case, the smart-card 17 securely stores the password.

When the single sign-on module 13 requests a login from an authentication server 140 of the type AUTH6 (arrow 143), the latter replies by requesting an authenticator (arrow 144). The single sign-on module 13 requests the authenticator (arrow 141). The smart-card 17 first derives the secret key by applying a secure hash function over the secret (password/PIN). Then it encrypts the data with the secret key previously derived using a symmetric cryptographic function scf, and gives out the authenticator to the single sign-on module (arrow 142) which transmits it (arrow 145) to the authentication server 140 for verification; if the authenticator is verified, the server 140 sends the authentication results to the single sign-on module 13 (arrow 146).

Figure 12:
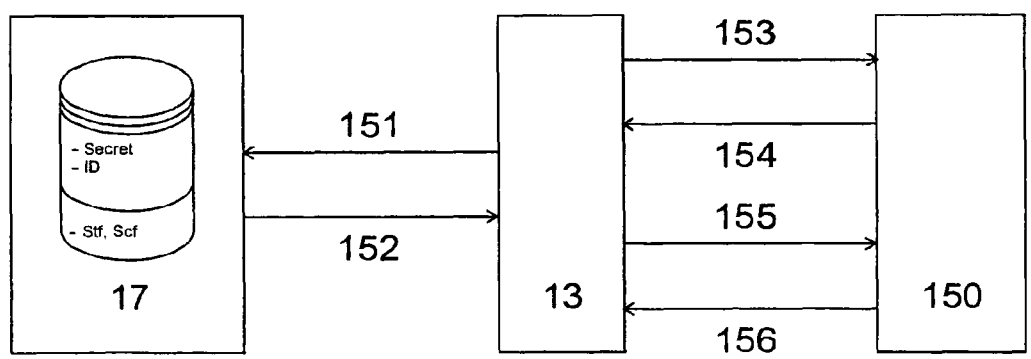
FIG. 12 illustrates an authentication process for an asymmetric authentication mechanism.

FIG. 12 shows the authentication process for AUTH7 (asymmetric algorithms without key protection), AUTH8 (asymmetric algorithms with weak key protection) and AUTH9 (asymmetric algorithms with strong key protection). In this case the smart-card stores the private key that serves to asymmetrically encrypt the data to produce the authenticator.

When the single sign-on module 13 requests a login from an authentication server 150 of the type AUTH7, AUTH8 or AUTH9 (arrow 153), the latter replies by requesting an authenticator (arrow 154). The single sign-on module 13 requests the authenticator (arrow 151). The smart-card 17 encrypts the data with the private key, using a secure transform function stf and/or a symmetric cryptographic function scf and sends the authenticator to the single sign-on module (arrow 152), which forwards it to the authentication server for verification (arrow 155); if the authenticator is verified, the server 150 sends the authentication results to the single sign-on module 13 (arrow 156).

The table 1 below resumes the smart-card storage and processing function for each kind of authentication mechanism:

| Types of authentication mechanism | Smart-card Storage and processing | | |
|---|---|---|---|
| | Cryptographic keys | Secret | Secure Functions |
| AUTH1 | — | Password or PIN | — |
| AUTH2 | Secret key | — | Symmetric cryptographic function |
| AUTH3 | — | — | hash function |
| AUTH4 | Don't apply | Don't apply | Don't apply |
| AUTH5 | Secret key | Password or PIN | Card activation function using PIN/password Symmetric cryptographic function |
| AUTH6 | | PIN/password | Secure transformation from PIN/password to secret key Symmetric cryptographic function |
| AUTH7 | Private key, Public key | | Asymmetric cryptographic function |
| AUTH8 | Private key, Public key | PIN/password | Card activation function using PIN/password Asymmetric cryptographic function |
| AUTH9 | Private key, Public key | PIN/password | Secure transformation from PIN/password to secret key Decryption of private key using secret key derived from PIN/password Asymmetric cryptographic function |

The table above shows a one-to-one mapping of the existing mechanisms into the smart-card 17. However, thanks to the properties of the smart-card, the mechanisms AUTH9 can be optimized or simplified without weakening these authentication mechanisms.

The smart-card to be used is preferably a secure smart-card. It has preferably the property to be tamperproof, i.e. it has to resist to all known types of hardware attacks.

In addition, software stored in a smart-card is usually composed of two parts: one stored in ROM, generally called the operating system (OS), and the other one stored in EEPROM, generally called the application. The OS and the application stored in a smart-card are so small and restrictive that it is possible to guarantee that some chosen data will never be read out.

While with a computer (and especially with a laptop), it is generally impossible to guarantee that the security provided by the OS will not be bypassed and that some secret data will be read out by an unauthorized person, with a smart-card we can assume that the security system will not be bypassed.

Based on the assumptions made above, there is no need anymore to store the private key of AUTH9 in an encrypted form in the memory of the smart-card.

Thus AUTH9 can be simplified and becomes the same as AUTH8, without decreasing its level of security.

If we refer to table 1, except AUTH3 and AUTH6 all secrets (PIN/passwords) are not directly involved in the calculation of the authenticator but only to protect the access to the calculation of the authenticator. Instead of having one secret for each system, we can define one secret at the smart-card level that protects the access to all types of authenticator calculations. The secret used to get access to the smart-card is called card activation secret or card activation PIN/password.

3—Overall Processing

Figure 13:
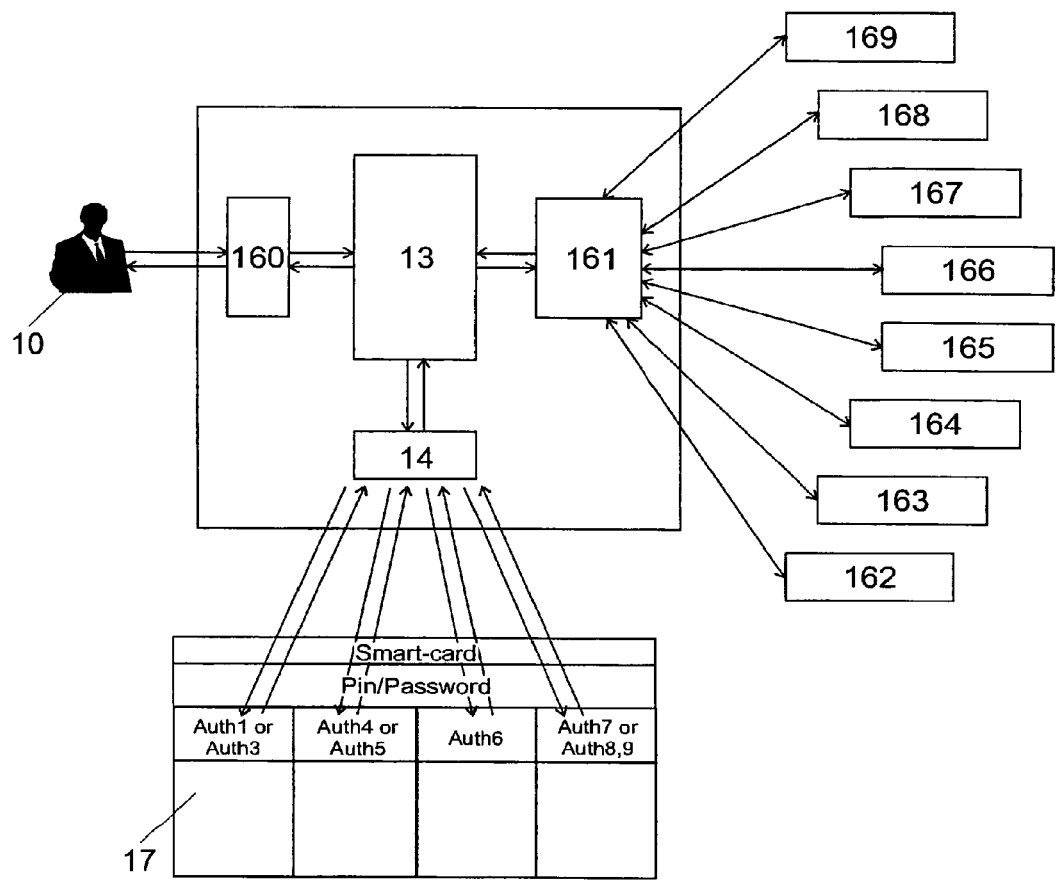
FIG. 13 illustrates the interaction between the components used for the single sign-on process.

We will now describe with FIG. 13 how the inventive single sign-on process works. The user 10 is prompted by the single sign-on module 13 at the beginning to enter a login name and a secret (PIN/password/biometrics) on a graphical user interface 160. This secret is used to activate the smart-card 17 through the smart-card interface 14, and thus the smart-card will be able to process all authentications required thereafter for each layer. An external interface 161 forwards the authentication requests from the various authentication servers 162 to 169 to the single sign-on module 13, and sends back the retrieved authenticator from the smart-card 17 to those servers.

The authentications are performed only if the smart-card 17 is in an active state. To be in such a state two conditions are mandatory: the smart-card must first be powered-on; then the correct activation secret must be given. When the smart-card is powered-off (i.e. removed from its reader), it automatically returns in an inactive state. Thus, a stolen card becomes unusable for an attacker.

Figure 14:
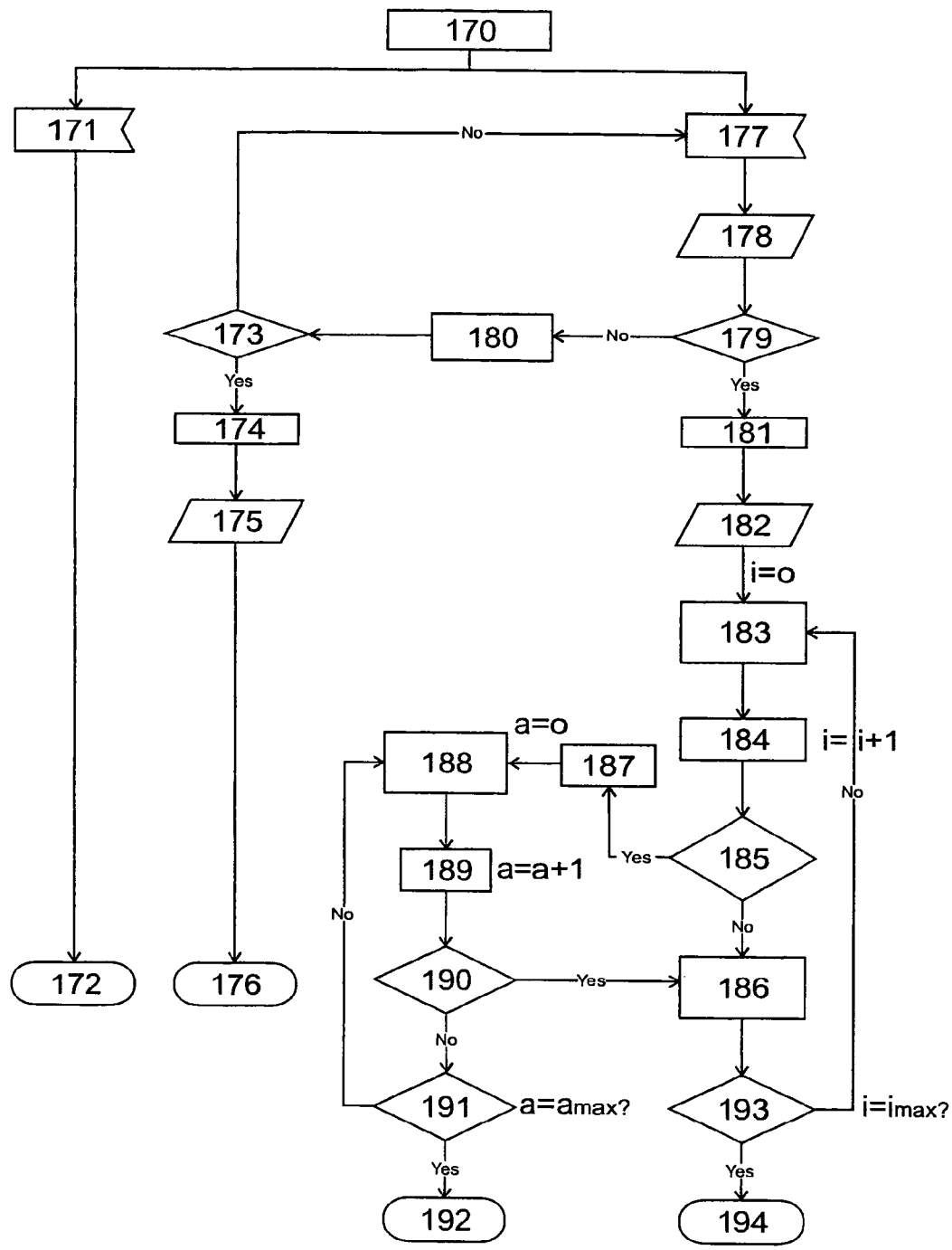
FIG. 14 shows a dataflow illustrating the process steps executed for the layer construction in an embodiment of the inventive process.

FIG. 14 shows the sequences of processes for the inventive single sign-on process for multi-layering authentication using a smart-card.

After the boot of the machine, the single sign-on (SSO) module 13 launches the graphical user interface (step 170) and prompts the user 10 for the login name and secret. The user may choose not to do the single sign-on and types cancel, e.g. when using the machine in a standalone mode (step 171). In this case, there is no remote login (step 172).

If the user 10 decides to enter a login name and secret (step 177), the single sign-on module transmits them during step 178 to the smart-card 17 for verification. If the smart-card is powered on, it verifies these data during step 179. When the login information provided is incorrect, the smart-card increases an internal counter (step 180). If its value is greater than a threshold value (test 173), then the card blocks itself to become unusable (step 174) and sends the login results to the single sign-on module 13 (step 175). The login has failed (step 176).

The authenticator used for the authentication of the user 10 may use biometrics parameters, e.g. fingerprints, iris pattern, retina pattern, voice parameters, face parameters, etc.

For example, the threshold value can be set to 3, permitting the user to try three times a log-on. This mechanism is implemented in the card, to prevent an attacker to do a brute force attack on the card i.e. trying all possible combinations of secrets until finding the one matching. Of course the counter is reset to 0 each time the user 10 has provided the right secret only if the card is not already blocked.

If the login information is correct, then the smart-card 17 turns itself into an active state (step 181) and acknowledges the single sign-on module (step 182). The latter can start to build the different communication layers (steps 183 to 184). Starting from the lowest level, it checks during step 185 if it requires an authentication for the establishment of the communication. If no authentication is required, the communication layer is automatically built-up during step 186.

If an authentication is required, then the remote authentication server sends the necessary data (if needed) to the single sign-on module 13. The single sign-on module transmits these data to the smart-card 17. The smart-card then returns the authenticator to the single sign-on module (step 188). This authenticator is then transmitted to the remote authentication sever for verification (step 190). The authentication server can perform the authentication itself, or delegates the verification of the corresponding authenticator to a third equipment (not shown). If the authentication is not valid, the authentication may be repeated a certain number of times using the counter value a which is set to zero at step 187 and incremented at step 189, and then, if still wrong (test 191), stopped either by the remote server or by the single sign-on module (step 192). If the authentication is correct, the communication layer set-up is completed (step 186). The single sign-on module 13 proceeds the same way with other layers $L_i$, until all $i_{max}$ layers are completed (incrementing step 193, ending step 194).

4—Transparent Layer Reconstruction

If, for any reason, one communication layer looses the connection, the single sign-on module 13 shall be able to rebuild the layer without user intervention. In this case, the single sign-on module 13 preferably verifies that the smart-card 17 is still present and in an active state. Then it has to send a new authenticator to the authentication server. The authentication procedure then proceeds as described above.

4. Embodiment Using GSM, PPP, IPSEC and NT

4.1—A New Emerging Remote Access Service

We will now describe in more detail an embodiment of the inventive process in which a communication is built between the client 10 and a remote server through GSM (Global System for Mobile), PPP (Point To Point Protocol), IPSEC (Internet Protocol Security) and Windows NT (New Technology; Trademark of Microsoft Corp.) network layers.

New terminals with high data rate (43.2 kbits/s and higher) dedicated to mobile telephony are coming onto the market. They integrate a GSM phone, a GSM SIM card, and support HSCSD (High Speed Circuit Switched Data), GPRS (General Packet Radio Service), EDGE (Enhanced Data for GSM Evolution) and/or UMTS (Universal Mobile Telecommunications System) technology for high speed communication. These terminals may be inserted in the slot of laptop just as a PC Card type II or type III, or be integrated in a mobile phone or personal digital assistant (PDA).

These terminals allow a fast access to remote locations without using the fixed telephone networks. Instead, the GSM network is used until the first ISDN (Integrated Services Digital Network) or PSTN (Public switched Telephone network) router. However, remote access presents different security risks as it might cross unprotected or public networks. IPSEC is a security protocol at IP (Internet Protocol) level that permits to guarantee a good level of security from the laptop to the point of entry of the remote network (generally called gateway). Finally, when mobile users try to connect to their corporate network, it is likely that they log onto their NT domain.

For such a remote access, many layers are built up progressively and normally each of them requires an authentication of the mobile user or of the machine that acts on behalf of the user. We will see hereafter how these different authentications may be performed with only one login action from the mobile user, using a smart-card.

4.2—Layers Construction

Figure 15:
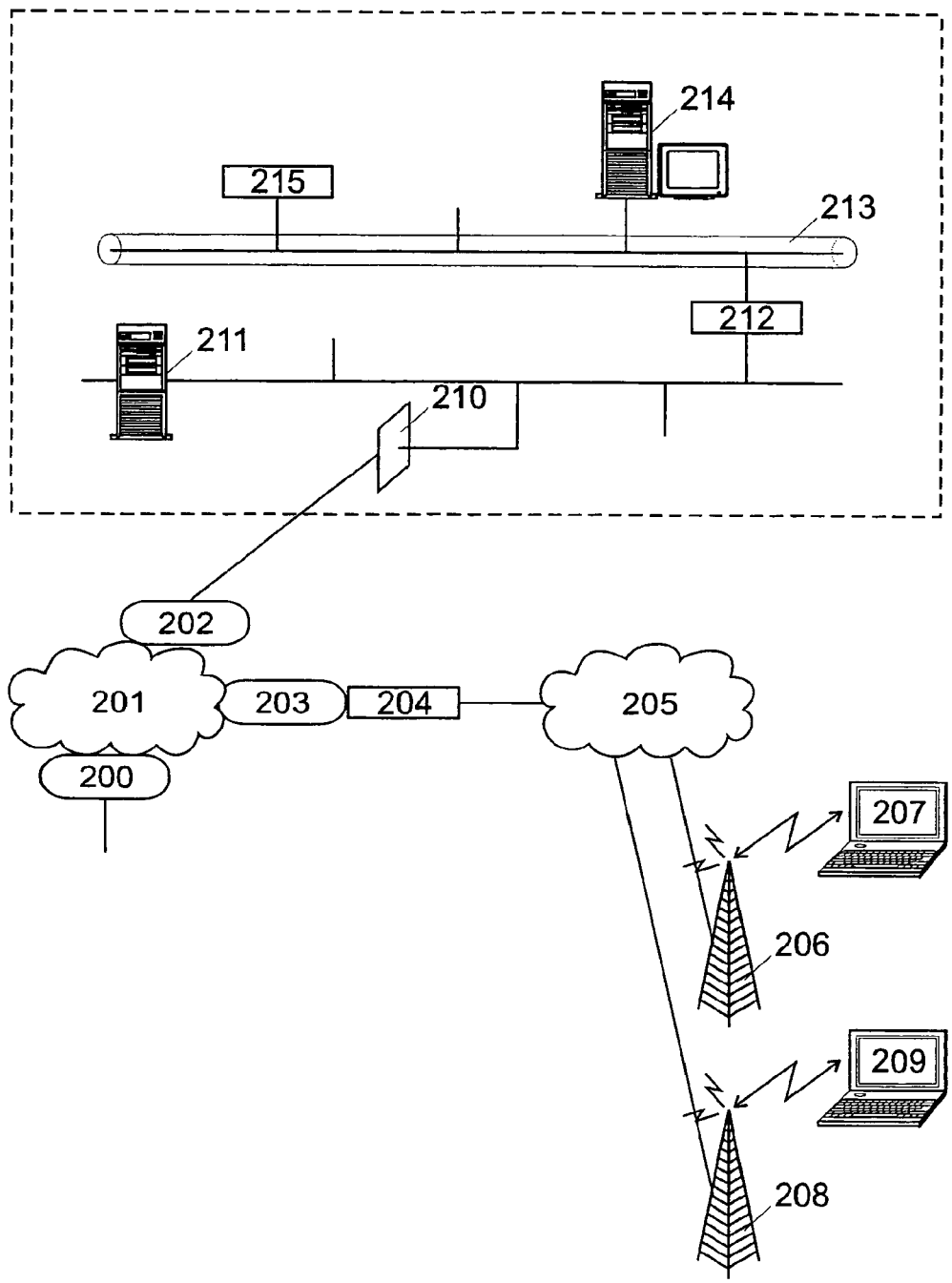
FIG. 15 illustrates a system comprising a GSM network, a PPP part, an IPSEC part and a NT part, in which the inventive process can be used.

This situation is illustrated in FIG. 15. A plurality of mobile users 207, 209 use mobile equipment such as a laptop computer, a personal digital assistant or a mobile phone to access data files and applications in a remote NT server 214 of their corporate network 213. The communication is established through a basis station 206 respectively 208 of a GSM network 205 and the internet 201 via an Internet service provider 203 using a router 204. The NT server 214 is connected to the Internet 201 via the corporate LAN 213, a router 212, an IPSEC gateway 211, a firewall 210 and another Internet service provider 202. Other routers 215 may be connected to the corporate network 213 to provide access to other networks and sub-networks. Other Internet service providers 200 provide access to the Internet 201.

Figure 16:
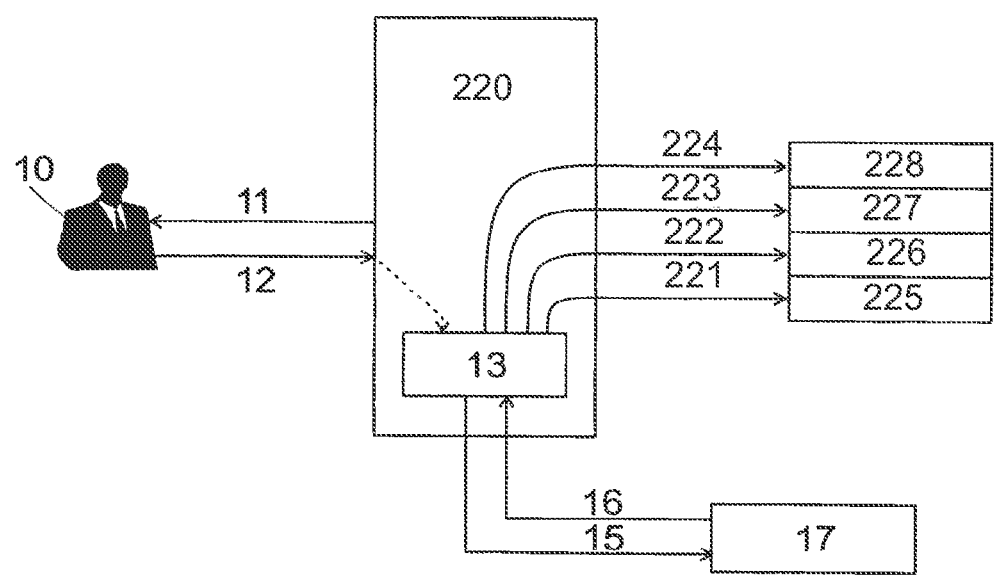
FIG. 16 shows how the layers are constructed in the system of FIG. 15.

FIG. 16 illustrates the layer construction in this specific embodiment of the invention. Elements and process steps equivalent to those already described in connection with FIG. 1 are designated with the same reference numbers and will not be described again. The single sign-on module 13 is shown here as a part of a middle-ware 220, e.g. a mobile equipment, a laptop, a palmtop, etc. The user 10 can access a remote server by constructing at least the following successive network layers:

a GSM layer 225, which requires a GSM authentication 221,
a PPP layer 226, which requires a PPP login with a CHAP authentication 222,
an IPSEC layer 227, which requires an IPSEC authentication 223,
an NT layer 228, which requires a NT login 224.

We will now describe the construction of those four layers.

4.2.1—GSM

The GSM layer 225 provides three security services: subscriber identity authentication, user and signaling data confidentiality, and subscriber identity confidentiality.

Figure 17:
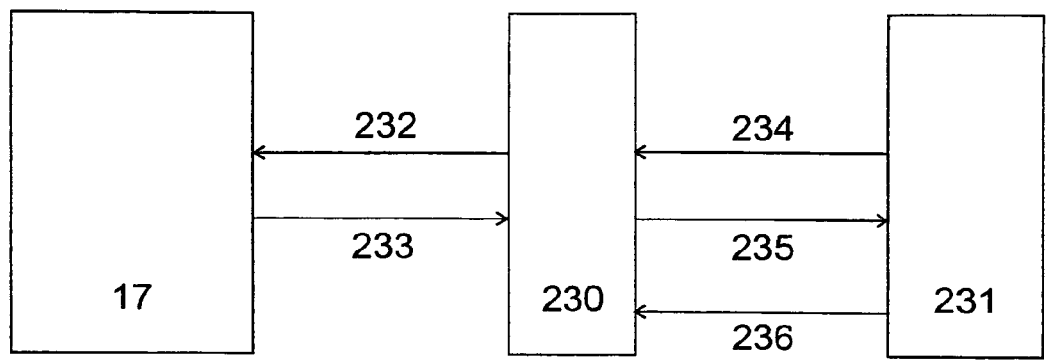
FIG. 17 illustrates the GSM authentication mechanism.

The first service is used to establish the identity of the mobile subscriber (MS) when he is trying to access the GSM network. The authentication is initiated by the fixed network 231 (FIG. 17) that sends a challenge 234 (random number) to the mobile phone 230. This challenge is forwarded (arrow 232) to the smart-card 17, also called SIM (Subscriber Identity Module) card in this context, which computes the response 233 by applying the A3 one-way hash function to the random number received with the secret key stored in the smart-card and with the user identification. This answer is forwarded to the network (arrow 235), which verifies it and acknowledges a success or a failure (arrow 236).

The secret key used for computing the hashed value is shared only by the smart-card 17 and an authentication center, which serves the subscriber's home network. The output of the hash computed by the SIM card 17 is transmitted to the fixed network 231, where it is compared with a pre-computed value. If the two hash values match, the user (mobile subscriber) has been authenticated, and the call is allowed to proceed. If the values are different, then access is denied. If the card has not been set in an active state (i.e. correct PIN entered), this authentication cannot occur.

4.2.2 PPP

Figure 18:
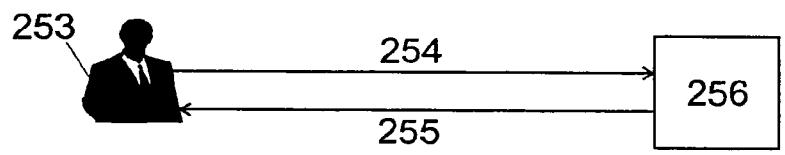
FIG. 18 illustrates the authentication mechanism for PAP two-way handshake.

The next layer uses the Point-to-Point Protocol (PPP), which provides a standard process for transporting multi-protocol datagrams over point-to-point links. With PPP different authentication processes are possible:

PAP (password authentication protocol), which uses a clear-text password,
CHAP, which uses a MD5 one-way hash function,
EAP, which uses a MD5 one-way hash function or OTP, SecureID 4.2.2.1—PAP The PAP (password authentication protocol), which is illustrated in FIG. 18, provides a simple process for a user 253 to establish its identity using a 2-way handshake with a remote server 256. This is done only upon initial link establishment.

After the Link Establishment phase is complete, an ID/Password pair 254 is repeatedly sent by the client to the authentication server until authentication is acknowledged (arrow 255) or the connection is terminated.

PAP is not a strong authentication process. Passwords are sent over the circuit in clear-text format, and there is no protection against replay or repeated trial and error attacks. The user 253 is in control of the frequency and timing of the attempts.

Figure 19:
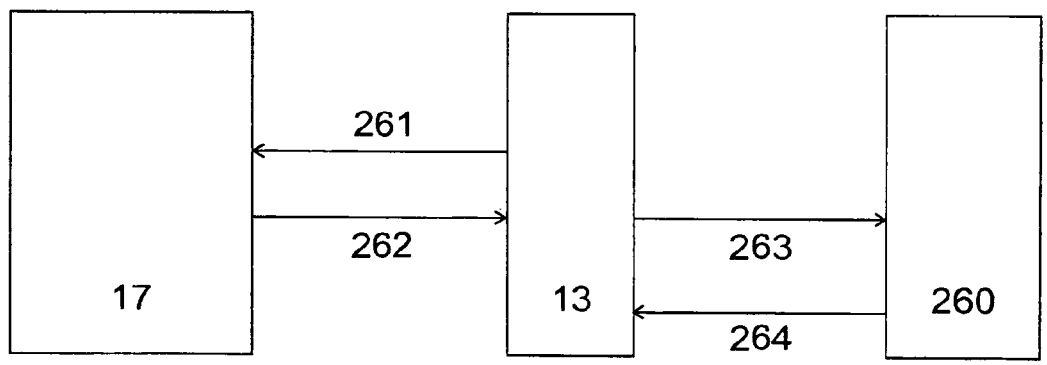
FIG. 19 illustrates the authentication mechanism for PAP integrating a smart-card.

This authentication process is of type AUTH1 as defined above. To integrate PAP with the smart-card 17, the ID and password shall be stored in the EEPROM of the smart-card. When the single sign-on module 13 initiates a PPP link with the remote server 260 (FIG. 19), it has to send an ID/password retrieve request (arrow 261) to the smart-card and to forward the answer 262 as an 'authenticate request' message 263. The remote server 260 answers with an authenticate acknowledge or no-acknowledge message 264.

4.2.2.2—CHAP

CHAP (Challenge-Handshake Authentication Protocol) is another widely used authentication process used by PPP. CHAP is used to periodically verify the identity of the user using a 3-way handshake. This is done upon initial link establishment, and may be repeated anytime after the link has been established.

Figure 20:
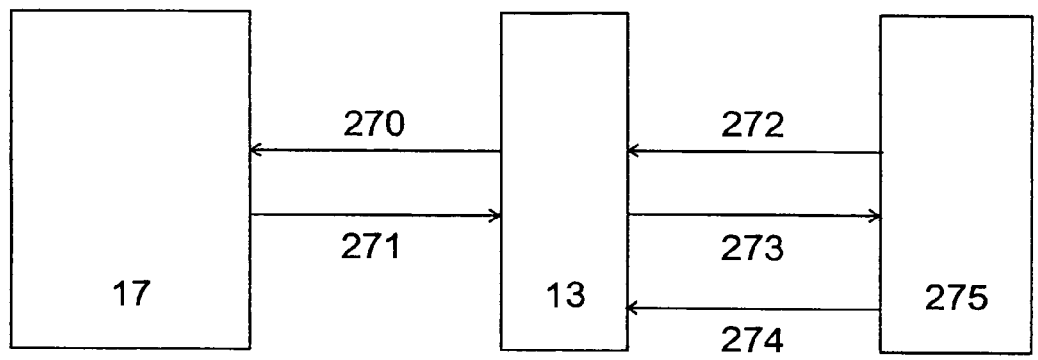
FIG. 20 illustrates the authentication mechanism for CHAP integrating a smart-card.

The integration of CHAP with the smart-card 17 is shown in FIG. 20. After the Link Establishment phase is completed, the authentication server 275 sends a challenge message 272 to the single sign-on module 13 of the user, which forwards it to the smart-card 17 (arrow 270).

The latter computes a hash value using the MD5 algorithm. This MD5 algorithm will use as input the ID (stored in the smart-card) concatenated with the password (stored in the smart-card) and concatenated with the challenge (issued by the server). The result 271 is sent to the single sign-on module 13, which forwards it to the server 275 (arrow 273). The server checks the response against its own calculation of the expected hash value. If the values match, the authentication is acknowledged (arrow 274); otherwise the connection is terminated.

CHAP provides protection against replay attack through the use of an incrementally changing identifier and a variable challenge value. The authentication server is in control of the frequency and timing of the challenges.

This authentication process is of type AUTH3 as above defined.

4.2.2.3—EAP

The PPP Extensible Authentication Protocol (EAP) is a general protocol for PPP authentication, which supports multiple authentication mechanisms. After the link establishment phase, the authentication server sends one or more requests to the user. In these requests the server asks for the type of authentication it desires (MD5, OTP—One Time Password—, etc.). The user can either acknowledge with a response packet including the authentication response, or denies the types of authentication proposed. The server has to propose other mechanisms until one matches. The MD5 authentication proposed in EAP is equivalent to a CHAP authentication, so its integration with a smart-card is the same as for CHAP. In the OTP authentication mechanism, a one-way hash function is also used, but it is applied multiple times. In addition in OTP, we have the choice among at least three hash algorithms, namely MD4, MD5 and SHA1. Nevertheless, this authentication process is of type AUTH3 as defined above and its integration with a smart-card will follow the principle defined.

Figure 21:
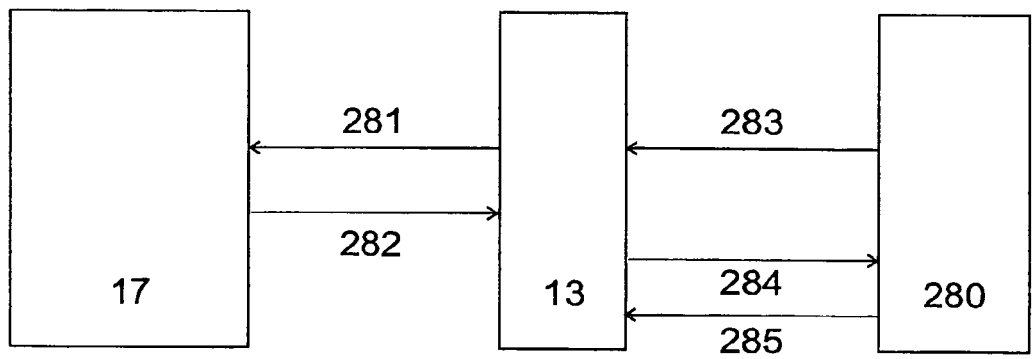
FIG. 21 illustrates the authentication mechanism for EAP using OTP integrated with a smart-card.

After the link establishment, the authentication server 280 (FIG. 21) requests an authentication, specifying the type (arrow 283). If MD5 is requested, the principle is the same as described for CHAP. If OTP is requested, the authentication server sends in the request, the algorithm required and the seeds (kind of random number). The single sign-on module 13 of the user forwards the seed and the algorithm type to the smart-card 17 (arrow 281). The smart-card 17 takes the OTP passphrase stored in its EEPROM, concatenates it with the seed received, then passes it through the hash algorithm selected. This first output is then passed n times through the hash algorithm. The final output 282 is then sent to the single sign-on module that transmits this result to the authentication server 280 through a PPP EAP response message 284. The result is checked by the authentication server that sends a PPP EAP success or failure message 285.

4.2.3—IPSEC 4.2.3.1 IPSEC Basic Description

The IPSEC layer 217 uses the IPSEC protocols, which have been designed to provide secure channel between peers at IP level. Authentication, integrity, confidentiality and key exchange are provided.

An IPSEC packet has the following structure:

AH|ESP wherein AH is an authentication header and ESP is an encapsulating security Payload AH provides connectionless integrity, data origin authentication using symmetric cryptographic algorithms, and replay protection thanks to a digital signature over a sequence number.

ESP provides data privacy (or confidentiality) using symmetric cryptographic algorithms, plus AH security services.

For key exchange, IPSEC uses IKE (Internet Key Exchange). It describes a framework in which IPSEC connections can negotiate authentication, encryption and key management information.

Figure 22:
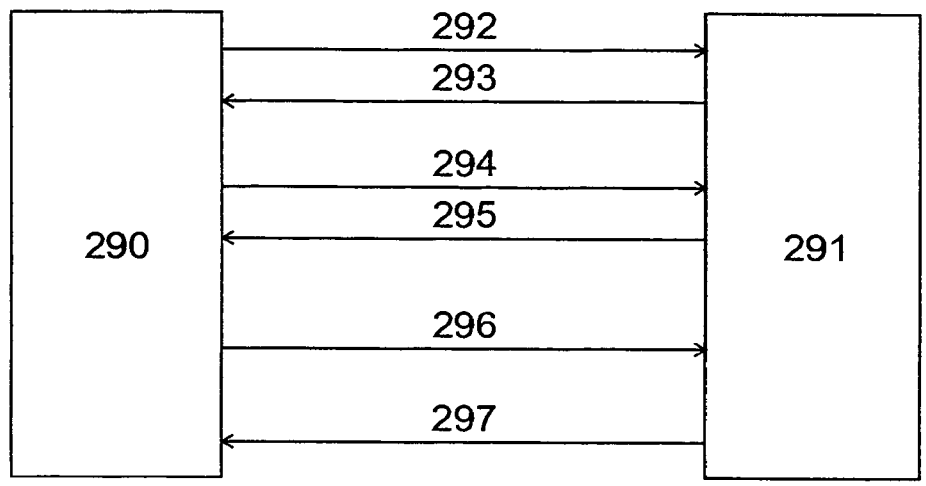
FIG. 22 illustrates the message exchanges during IKE (Internet Key Exchange) main mode.

IKE is divided in two phases: the Main mode and the Quick mode. In the main mode, which is illustrated in FIG. 22, an IKE Security Association (IKE SA) is defined. It contains all necessary information for two entities to exchange secured messages. In the Quick mode an IPSEC SA is derived from the IKE SA to negotiate the keys for use with an AH and ESP.

The first message exchange is the negotiation of parameters. The initiator 290 proposes different algorithms for encryption and authentication, an expiry time and other parameters (arrow 292). The responder 291 has to choose one option for each parameter and transmit its response 293.

In the second message, exchange nonces and Diffie-Hellman public keys are transmitted. Nonces are random numbers, one (294) generated by the initiator and the other (295) by the responder. The particularity of Diffie-Hellman is that both parties can compute a secret key only by exchanging DH public keys because:

DH=DH_Public_I exp (DH_Private_R)=DH_Public_R exp (DH_Private_I)

The DH key calculated is used to encrypt the third message exchange. These messages 296, 297 contain a signature made with a private key of each partner and an identification payload. This signature is applied over a hash. This hash is a function of the nonces, the Diffie-Hellman public keys, the negotiation parameters, the identification of the initiator (or responder) and the Identification payload.

Hash_I=fct {nonce_I; nonce_R; DHpublic_I; DHpublic_R; parameters_I; ID_I; etc.}

Sign_I=sign(Hash_I)$_{Kpriv\_I}$

By verifying the signature, the responder can be sure of the identity of the initiator, and can be sure that the two previous messages were really sent by the initiator. In its turn, the initiator can verify the same about the responder.

In addition to the messages exchanged and the computation described above, three secret keys are generated. They are used for the next mode called quick mode. These keys are:

Skey_d: Secret key used to derive future keys

Skey_a: Secret key used to authenticate messages exchanged in quick mode

Skey_e: Secret key used to encrypt messages exchanged in quick mode

Figure 23:
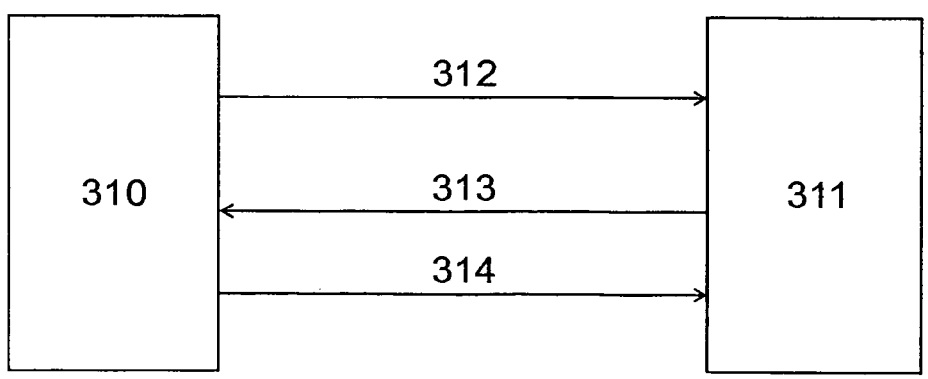
FIG. 23 illustrates the message exchanges during IPSEC quick mode.

In the quick mode illustrated in FIG. 23 random numbers are exchanged between the initiator 310 and the responder 311 during steps 312 and 313. Those numbers are used to generate new keys to be used to encrypt ESP and sign AH header of IPSEC packets 314.

The authentication in IKE main mode can be accomplished by different algorithms. In the message exchanged shown in FIG. 22, we have illustrated only one type of authentication. Among the possible authentication processes, IKE proposes a pre-shared secret using a symmetric algorithm, DSS signatures, RSA signature, Encryption with RSA and Revised encryption with RSA. Whether we use one authentication or other, the message exchanged might slightly differ while the principle remains the same.

4.2.3.2 Operations to be Done in the Smart-Card

A considerable amount of keys is generated in the IPSEC protocol. In addition, a lot of encryption/decryption and signature operations are done. Only very powerful and expensive smart-cards can perform all these operations; most cheap smart-cards lack memory and power processing.

Thus, we have to carefully choose which operations have to be performed by the smart-card 17.

The most critical key is the one used to perform the signature in the third message exchange 296, 297 of the main mode. Not only is this key used to verify the identity of the initiator 290/responder 291, but it also serves to authenticate the first DH keys and nonce 294, 295 from which all the rest of the keying material is derived. In the case of the initiator 290 being represented by a laptop, if this key is compromised then any communication with a gateway accepting this laptop is also compromised and more harmful, any access granted to this laptop is also granted to the attacker.

The smart-card 17 shall perform at least this signature operation (if signatures are used for authentication; if other authentication processes are used, the equivalent operation shall be performed by the smart-card 17).

For the other operations, it is a trade-off between security and capacity (both processing and memory) of a smart-card. For example, we can imagine generating the DH keys of the main mode in the smart-card; it is also possible to perform all the main mode in the smart-card (DH keys, hash calculation and signature over the hash).

Another point that is not mentioned in IKE, but that is present in most IPSEC implementation, is the certificate. Each time we use public key systems we have to provide along with the public key a certificate. This certificate is generated by a trusted third party called CA (Certification authority). The certificate is in fact a signature by the CA over the public key of the Initiator/responder. It certifies that this public key really belongs to the Initiator/responder. This certificate may be stored in the smart-card, or in a central server (e.g. in an X.500 directory).

4.2.4—Windows NT Layer

The SMB protocol is used in order to access the Windows NT layer 218 in a remote location, and a session authentication occurs to guarantee access control. The used dialect is negotiated between the client and the server. Three possibilities can occur:

Plaintext session authentication
LanMan challenge/response session authentication
NTLM challenge/response session authentication Plaintext session authentication consists in simply sending the NT password in clear-text format to the authentication server called the PDC (Primary Domain Controller). This authentication is used with old Lan Manager and SMB servers and should be avoided whenever possible.

LanMan challenge/response session authentication encrypts the challenge sent by the PDC using a key derived from the NT password. This key is called the LM hash and is explained below.

NTLM challenge/response session authentication encrypts the challenge sent by the PDC using another key derived from the NT password. This key is explained below.

Both for LanMan and NTLM authentication, the client encrypts the challenge three times using DES algorithm, where each encryption uses a different section of the keys (LM hash or MD4-NT hash) as the source material for the DES key. The ciphertext is returned to the PDC which then performs the same encryption process using its own copy of the users' password hashes from the SAM (Security Account Manager) database. If the client and server get the same results, the user is authenticated.

4.2.4.1—LM Hash in Windows NT

The Lan Manager hash (LM Hash) is used in order to be compatible with older versions of Microsoft networking software. It can be found in the SAM of the primary domain controller PDC and a variation of it is sent on the network for remote authentication purposes. Note that it is now possible to avoid the LM hash to be sent on the network in a pure NT environment (i. e. no Win 95 systems or other legacy).

The LM hash is generated by limiting the user's password to 14 characters padding with nulls if it is shorter, converting all characters to ASCII uppercase, breaking the 14 characters (single byte OEM character set) into two 7 byte blocks, expanding each 7 byte block into an 8 byte DES key with parity, and DES ECB encrypting a known string with each of the two keys and concatenating the results.

4.2.4.2—MD4-NT hash in Windows NT

The MD4-NT hash (often also called only NT hash) is created by taking up to 128 characters (in practice the NT password is limited to 14 characters by the GUI) of the user's password, converting it to unicode (a two byte character set used heavily in NT), and taking the MD4 hash of the string, which produces 16 bytes called "NT password hash"; they are stored in the SAM database.

4.2.4.3—Integration with Smart-Card

The Plaintext NT password authentication is of type Auth1.

The NTLM and LanMan authentications are both of type Auth6, even if the LM hash doesn't use a pure hash function.

Figure 24:
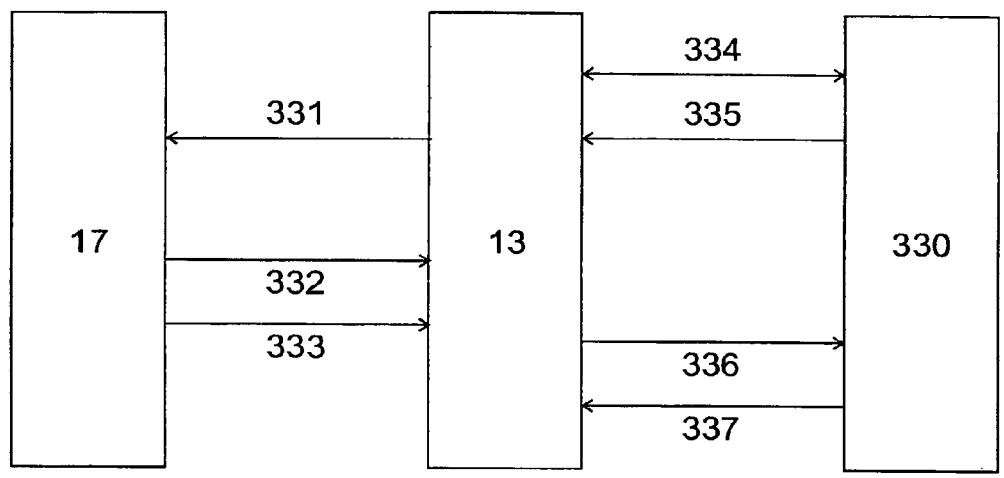
FIG. 24 illustrates the authentication mechanism for NT.

FIG. 24 illustrates the dialogue exchange for a NT authentication performed with a smart-card 17. At negotiation, the type of NT authentication is asked by the single sign-on module on the client's side (arrow 334). If encrypted passwords are used, the primary domain controller 330 sends a challenge to the single sign-on module 13 (arrow 335). This challenge is forwarded to the smart-card 17 (arrow 331), which encrypts it using LM hash or NT hash as a key. These hash are derived from the NT cleartext password stored in the EEPROM of the smart-card, using transformation functions. The smart-card answers with a cleartext password (arrow 332) or with an encrypted password (arrow 333), which is forwarded by the single sign-on module 13 to the PDC (arrow 336). The primary domain controller verifies the password and answers with a success or failure packet (arrow 337).

4.2.4.4—Simple Integration for NT

In the previous paragraph we have seen how to integrate the NT authentication with the smart-card following the general principle described above. However, for various reasons a simpler integration might be judicious. First, to integrate the NT authentication as described above requires a modification of the Operating System. This might not be easy and recommended. In addition, the NT authentication may require too much space in the smart-card memory. Finally, the authentication mechanism of Windows 2000 is different from NT. The update to Windows 2000 and to subsequent operating systems is much easier to perform on a computer than on a smart-card.

Thus it is recommended, at least in a first phase, to keep the NT authentication processing on the laptop, but to store the NT password on the smart-card. The smart-card in this case just serves as secure NT password storage, and each time an NT authentication is required, the smart-card gives the NT password to the OS (Win NT or Win95), through the single sign-on module, provided the smart-card is in an active state (i.e. powered on and correct activation PIN/password entered).

4.3 Summary of Smart-Card Integration with GSM, PPP, IPSEC, NT

Figure 16A:
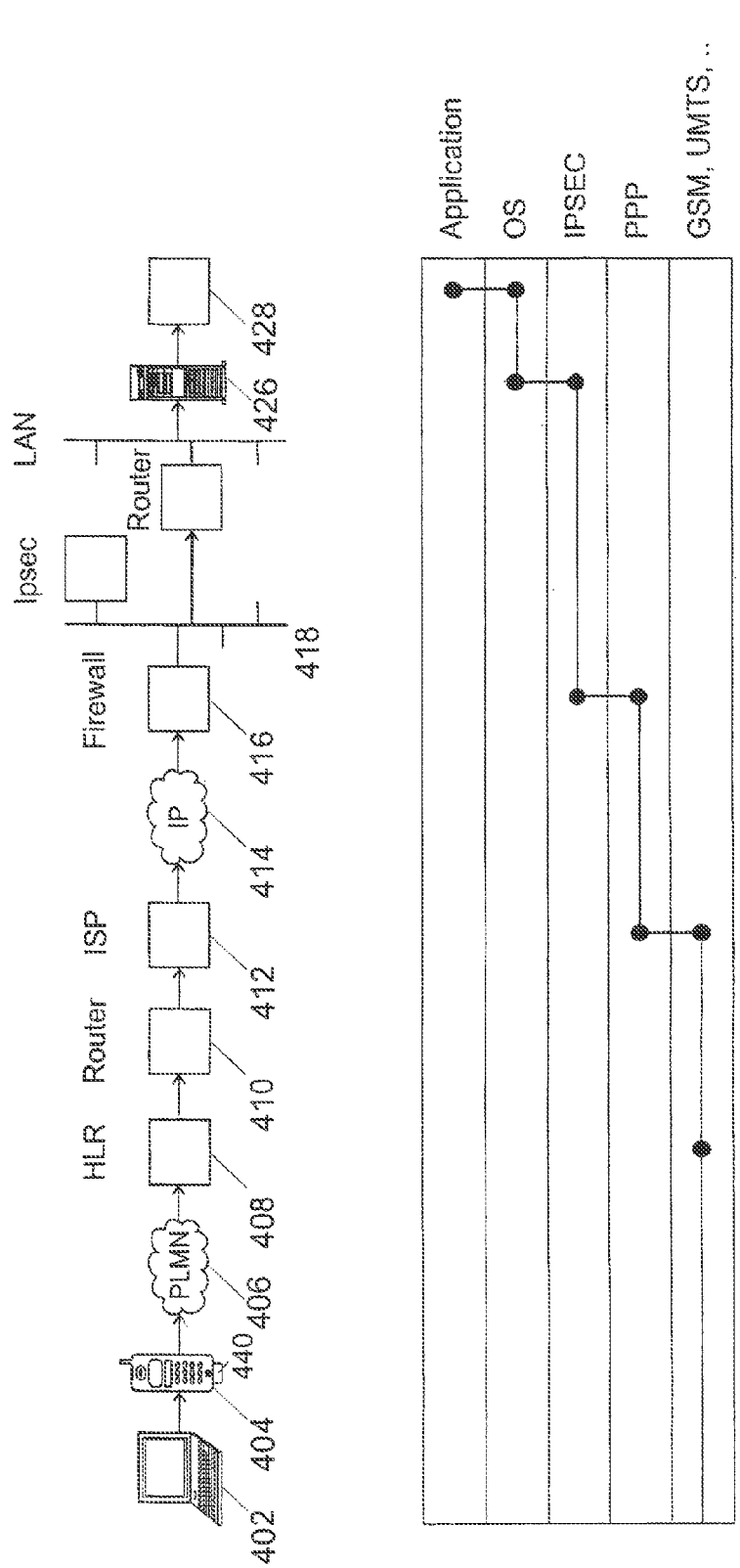
FIG. 16a illustrates the layer construction according to the inventive process.

FIG. 16a illustrates how a connection is established between the laptop 402 and the remote location 428 by successively constructing the successive superimposed network layers. The laptop first establishes a GSM connection with an internet service provider 412 via a mobile equipment 404 using a SIM-card 440, a public land mobile network 406, a home location register 408 in this PLMN, and a router 410 connected to this HLR. The next PPP layer is constructed by authenticating the user 402 in the ISP, thus allowing access through the Internet 414 to a firewall 416 of the user's corporate network 418. If the user can be authenticated in this firewall, the next IPSEC layer may be constructed, so that the user can access the requested domain in the server 426. A domain authentication is performed in this server in order to build the last protocol layer allowing the user to access the requested files in the remote location 428.

The table below summarizes the smart-card integration with GSM, PPP, IPSEC and NT:

| Layer | Authentication material | Authentication algorithm/function |
| --- | --- | --- |
| GSM | Authentication key | GSM algorithm (A3, etc.) |
| PPP | PAP password | no processing |
|  | CHAP password | MD5 |
|  | OTP passphrase | MD4 |
|  |  | MD5 |
|  |  | SHA1 |
| IPSEC | Keys | Pre-shared secret |
|  | Certificate | algorithm |
|  |  | DSS |
|  |  | RSA signature |
|  |  | RSA encryption |
|  |  | RSA encryption revised |
| NT | NT Domain password | NTLM hash algorithm |
|  |  | MD4-NT algorithm |
|  |  | DES |
| NT (simple integration) | NT Domain password | no processing |

This table summarizes what should be implemented in the smart-card in order to realize the authentications for the different layers involved, namely GSM, PPP, IPSEC and NT. Keys and Passwords should be stored in the EEPROM of the smart-card. For the different cryptographic algorithms, the following guidelines may be followed: symmetric algorithms should be coded in ROM; for asymmetric algorithms, a dedicated cryptographic coprocessor should be present in the smart-card.

It is obvious that before any authentication may take place, the smart-card shall be in an active state, i.e. the user shall enter the right secret (PIN/password/biometrics).

GSM smart-cards (called SIM cards) already exist. The corresponding SIM software will be reused as it is in the smart-card that will integrate the single sign-on system.

As already described, we already have card phone devices that integrate a SIM card and that can be plugged into the PC slot as a standard PC card. It is recommended to use the same card phone device to put in the single sign-on smart-card in place of the SIM card.

4.4—Direct Internal Access and Remote Access Compatibility

In the previous paragraph, we have seen how to implement a single log-on for the authentications of each layer concerned (GSM, PPP, IPSEC, NT).

However, we will now explain here enhancements to what was presented before.

4.4.1—Problem Description

In the remote access service described, we are considering mobile users with laptops remote-accessing their corporate network. But it is likely that they also use their laptop while they are at their office. With the growing number of docking stations, users can easily use their laptop as their normal office computer directly connected to their internal corporate network. In this situation there is no need anymore to have the card phone device, and users only have to log into their NT domain. To do this they will have to use their NT password. However, in the description given, it is said that the user has only to remember the secret that makes the smart-card active, and then all the authentications are processed. In the case where the users also want to use their laptop directly as an internal machine (only NT login), they have to remember a second secret in addition to the smart-card secret, namely the NT password.

In a single sign-on system we want to avoid having more than one secret to remember.

The simple solution is to make the NT password the secret to activate the smart-card. Thus, the same secret can be used both for remote access single sign-on and for login to the NT domain for direct internal access.

Unfortunately, with such a solution another issue arises. If users change their NT password when they are directly connected to their internal network, this new secret cannot be updated at the same time in the smart-card (because the card phone terminal containing the smart-card is not plugged in the PC slot). The next time users want to remote-log onto their network using the smart-card, the NT password stored in the DC will be desynchronized with the NT password stored in the smart-card. A protected mechanism shall be implemented to ensure the secret synchronization.

4.4.2—Solution: Secret Synchronization

The principle for the secret synchronization is the following:

If a user is directly connected to the internal network, the old and the new NT passwords (secrets) are concatenated and encrypted with a synchronization public key stored in the PC. The next time the user logs in remotely, the two encrypted secrets are transmitted to the smart-card 17, which decrypts them using the corresponding synchronization private key of the smart-card. Then, the old secret is compared with the one stored in the smart-card, and the new one is compared with the one entered by the user. If both results are correct, then the secret is updated in the smart-card and the building of the layers can proceed normally.

Figure 25:
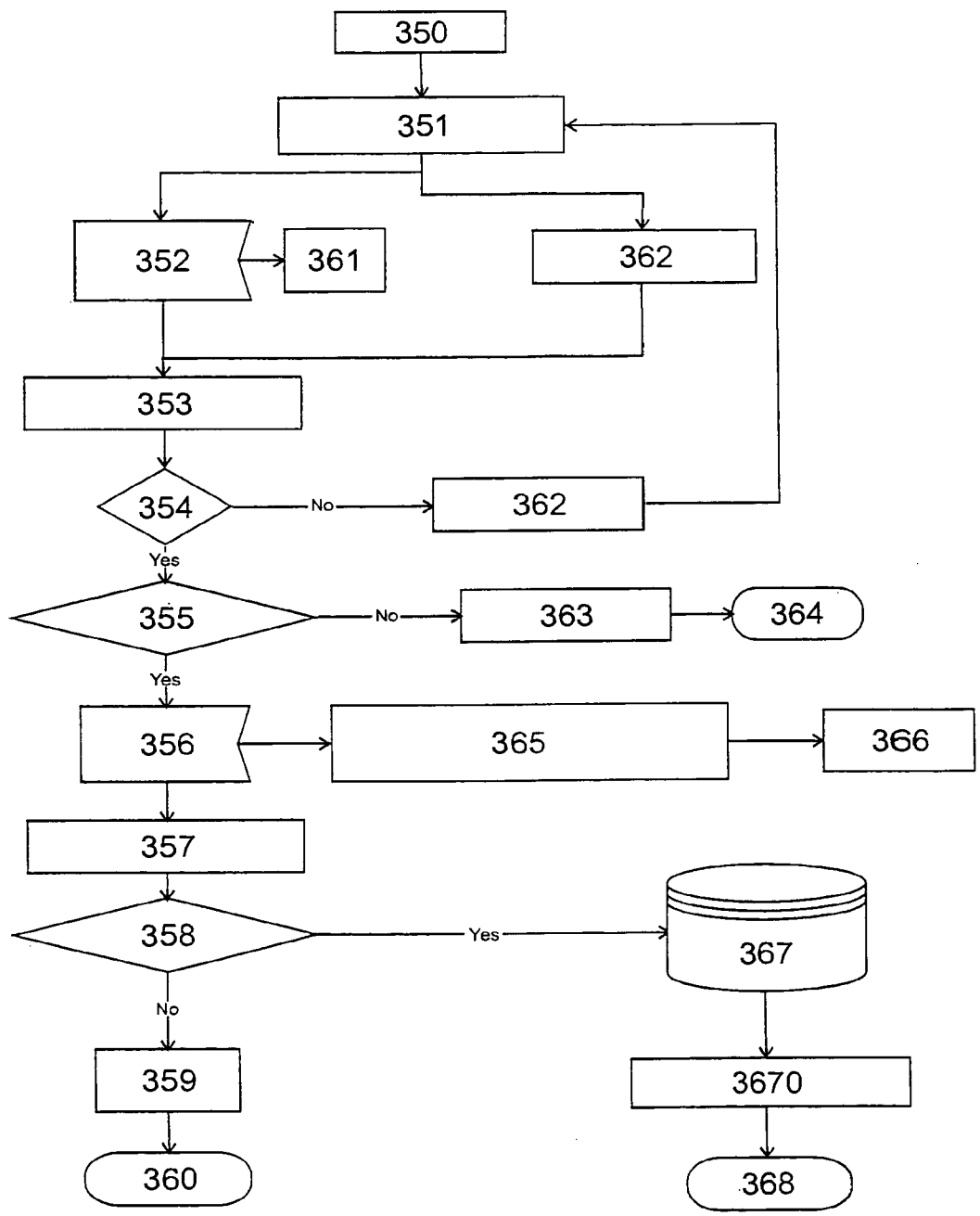
FIG. 25 illustrates the process steps of a secret synchronization process which is performed when a secret change has been requested by the operating system.
Figure 26:
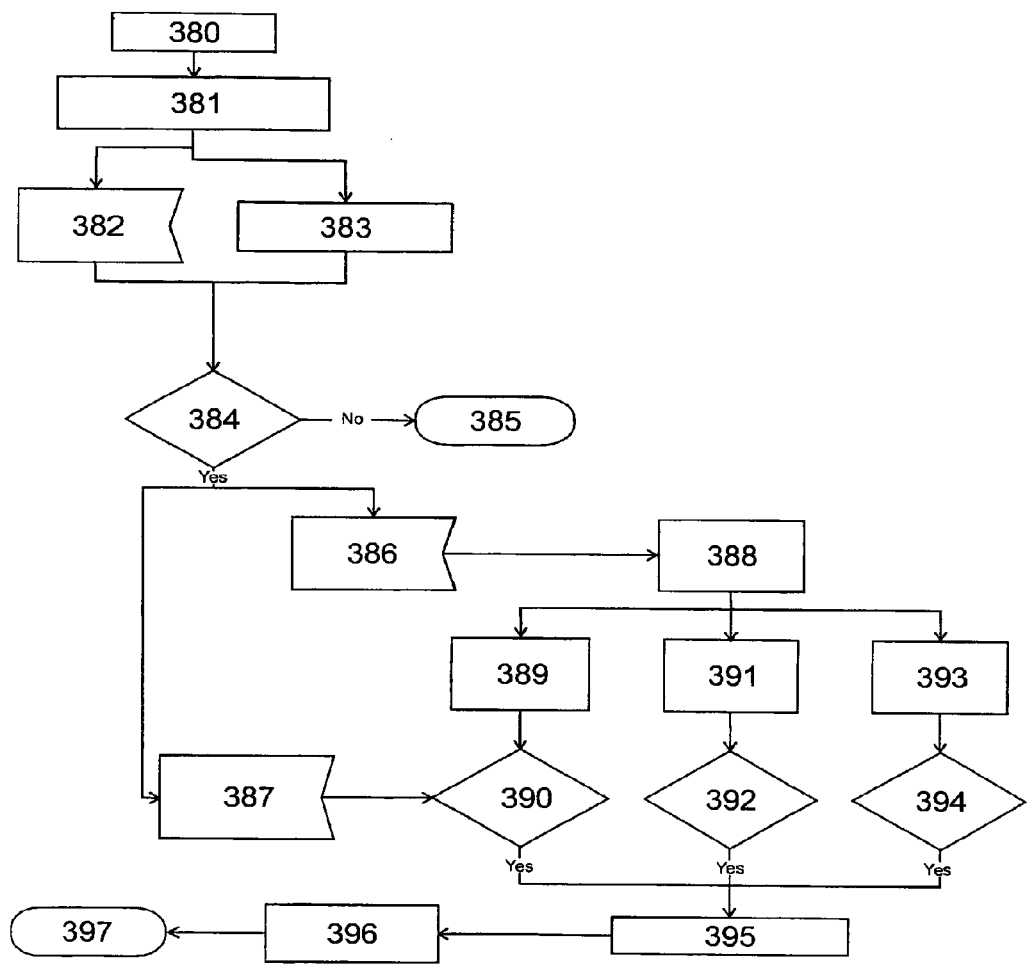
FIG. 26 illustrates the process steps of a secret synchronization process which is performed when a secret change has been requested by the user.

The processing for secret synchronization is depicted in FIG. 25 and FIG. 26, and explained in detail hereafter.

After the boot 350, the single sign-on module 13 of the laptop launches the login GUI (351). The single sign-on module detects that there is no smart-card (362) (i.e. the card phone terminal is not plugged in the PC slot), and prepares itself for the secret synchronization. When the user types in his/her NT secret (352), the single sign-on module keeps the NT secret in the laptop's RAM (361). In parallel, the normal NT domain login proceeds (353). If the NT domain secret previously entered by the user is not correct (test 354), the single sign-on module clears the secret stored in RAM (3620) and restarts at 351. Note that the number of possible trials for NT secrets is generally determined by the password policy. If the NT secret entered by the user is correct, i.e. the NT domain authentication succeeds, then the user may be requested to change his/her secret (test 355). Note that this automatic secret change request is generally defined in the password policy. If no secret change request is required, the NT secret kept in RAM is cleared from this memory (363) and the processing is ended (364). Otherwise, the user has to enter his new secret (356). The single sign-on module intercepts this new secret, concatenates it with the old one previously kept in RAM (365). These two secrets are then encrypted with a public key (365). This public key will be further referenced as the synchronization public key.

The synchronization key pair is a pair of cryptographic keys to be used by an asymmetric encryption algorithm. Examples of asymmetric encryption algorithms include RSA, ECC, etc. The synchronization private key shall be stored on the EEPROM of the smart-card only, and it shall never be possible to read it out. One copy of the synchronization public key shall be stored on the laptop's disk. It is recommended to have a good enough key length. For example if RSA is used, it is highly recommended to have a length of at least 1024 bits. For other algorithms, comparable strength should be used.

When the two NT secrets concatenated are encrypted, optional fields may be added with the secrets. Information such as date and time may be inserted; a sequence number and/or a random number may also be included. These parameters may enhance the security, in the sense that they render the secret encryption unique throughout time. Although replay attack may be difficult to realize and unlikely to succeed, such measures prevent these attacks.

The encrypted result is first stored in the laptop's RAM (366). If the NT secret change procedure (357) fails for any reason (test 358), the RAM is cleared (359) and the processing is ended (360), otherwise the result (2 encrypted passwords) is stored in a file on the laptop's disk (367). Appropriate measures should be taken to set minimum access permission to this file. Finally, an optional desynchronized state flag may be set (step 3670), to further indicate to the smart-card that the two secrets are desynchronized and the processing is ended (368).

Note that in the whole process described above, we assumed that the NT domain secret change was requested by the operating system. Obviously secret change may be initiated by the user, and this does not change the processes, except that the single sign-on module catches the 2 secrets at the same time (because users have to re-enter their old secret in addition the new one when they want to make a change).

The second part of the secret synchronization is realized when the user is using his/her laptop in remote access with the smart-card. This process is depicted in FIG. 26 and the details are explained hereafter.

After the boot of the computer is completed (380), the single sign-on module launches the graphical user interface (381) for the user to log in. The user types in his/her NT domain secret and name (382). In the meantime, the single sign-on module detects the smart-card presence in the computer slot (383). The single sign-on module checks then the desynchronized state (384). If there is no desynchronization, it means that the NT secret stored in the smart-card and the hash of the NT secret stored on the operating system match. In this case the authentications and construction of the layers can proceed (385) as described above.

If we have a desynchronized state, then the single sign-on module starts to re-synchronize the secrets. It sends to the smart-card the encrypted information containing the two secrets plus the optional information (386). It also passes to the smart-card the NT secret just typed by the user (387). The smart-card decrypts the information (388) using its synchronization private key stored in EEPROM. The smart-card can then extracts the old (391) and the new secret (389) as well as the optional information (393). Three conditions should be met in order to proceed with the synchronization: the old NT secret extracted from the data decrypted has to be the same as the one previously stored in the smart-card (test 392); the new NT secret extracted from the data decrypted has to be the same as the one just typed by the user (test 390), finally the optional fields have to be correct (test 394). For example, if we have a sequence number in the optional fields, the sequence number extracted from the data decrypted has to be greater than the one previously stored in the smart-card. If and only if all these conditions are fulfilled, then the smart-card can update the NT secret in its EEPROM with the new one (395). In addition, optional fields also have to be updated. If one of the above conditions is not met, then the synchronization shall stop, i.e. no secret update shall occur. In addition, the smart-card and the single sign-on module should not proceed with the layer construction and corresponding authentication described above.

Otherwise, the smart-card informs the single sign-on module that the secret has been successfully updated. The single sign-on module deletes the file with the encrypted data (the two secrets plus the optional fields), and resets its desynchronization state (396). Finally, the authentications and construction of the layers can proceed (397) as described above.

The one skilled in the art will recognize that this process of secret synchronization can be used for synchronizing any secrets between any pair or remote locations in a telecommunication network, independently from the described single sign-on process.

4.5—Transparent Layer Reconstruction

It is likely that the GSM communication may be cut off. The single sign-on module should rebuild the layer without user intervention provided the user has not removed the terminal containing the smart-card from the PC slot.

What is claimed:

1. A method for allowing a user to remotely access a remote location, the method comprising:
   sending by a server associated with the remote location, an authentication request to user equipment associated with the user, in response to the user requesting remote access;
   receiving by the server, corresponding remote-access authentication data from the user equipment, wherein:
      the remote-access authentication data is obtained, without requiring user input, from an activated smart-card associated with the user equipment,
      the smart-card is activated based on successful verification of the user using local-access authentication data,
      the local-access authentication data is provided by the user in response to request by the user equipment,
      the local-access authentication data is different from the remote-access authentication data, and
   authenticating the user by the server based on the remote-access authentication data, wherein the user is granted access to the remote location over a communication network based on successful authentication of the user.

2. The method of claim 1, comprising independently authenticating the user for each of a plurality of layers used in establishing connectivity between the remote location and the user equipment based on at least a portion of the remote-access authentication data.

3. The method of claim 1, comprising processing the remote-access authentication data to facilitate authenticating the user.

4. The method of claim 3, comprising processing the remote-access authentication data by applying to at least a portion of user related authentication information at least one cryptographic function, based on at least one key.

5. The method of claim 1, wherein:
   the server associated with the remote location comprises an IPSEC gateway;
   the remote-access authentication data comprises IPSEC-related data; and
   authenticating the user comprises verifying the identity of the user by the IPSEC gateway using the IPSEC-related data.

6. The method of claim 1, wherein:
   the server associated with the remote location comprises a firewall;
   the remote-access authentication data comprises firewall-related data; and
   authenticating the user comprises verifying the identity of the user by the firewall using the firewall-related data.

7. The method of claim 1, wherein:
   the server associated with the remote location comprises an operating system domain based server;
   the remote-access authentication data comprises domain-access data; and
   authenticating the user comprises verifying the identity of the user by the operating system domain based server using the domain-access data.

8. The method of claim 7, wherein the domain-access data comprises a password for logging onto the operating system domain.

9. A method for allowing a user to remotely access a remote location, the method comprising:
   in user equipment associated with the user:
      receiving local-access authentication data from the user;
      authenticating the user based on the local-access authentication data;

activating a smart-card when the user is successfully authenticated using the local-access authentication data; and
in response to the user requesting remote access to the remote location, for each authentication request received from a server associated with the remote location:
obtaining corresponding remote-access authentication data from the smart-card; and
sending the remote-access authentication data to the server associated with the remote location; and
wherein:
the remote-access authentication data is different from the local-access authentication data,
the remote-access authentication data is provided by the smart-card, once activated, without requiring additional user input, and
the user is granted access to the remote location over a communication network based on successful authentication of the user.

10. The method of claim 9, comprising computing at least a portion of the remote-access authentication data using at least one cryptographic function, based on at least one key.

11. The method of claim 9, comprising establishing connectivity to the remote location over the communication network, the establishing comprising setting up a plurality of communication layers.

12. The method of claim 11, comprising generating, obtaining, and/or sending the remote-access authentication data to enable authenticating the user independently for each of the plurality of layers.

13. The method of claim 11, comprising:
sequentially constructing each one of the plurality of layers; and
obtaining and sending for each one of the plurality of layers, respective remote-access authentication data to enable independently authenticating the user for said one of the plurality of layers.

14. The method of claim 11, wherein:
the remote location comprises one or more of an IPSEC gateway, a firewall, and a server associated with an operating system domain; and
the remote-access authentication data comprising a corresponding one or more of IPSEC-related data, firewall-related data, and domain-access related data.

15. A system comprising:
one or more servers for use in allowing a user to remotely access a remote location, wherein each server is operable to:
send an authentication request to user equipment associated with the user, in response to the user requesting remote access;
receive corresponding remote-access authentication data from the user equipment, wherein:
the remote-access authentication data is obtained, without requiring user input, from an activated smart-card associated with the user equipment,
the smart-card is activated based on successful verification of the user using local-access authentication data,
the local-access authentication data is provided by the user in response to request by the user equipment, and
the local-access authentication data is different from the remote-access authentication data; and
authenticate the user based on the remote-access authentication data, wherein the user is granted access to the remote location over a communication network based on successful authentication of the user.

16. The system of claim 15, wherein the one or more servers are operable to independently authenticate the user for each of a plurality of layers, used in establishing connectivity between the remote location and the user equipment, based on at least a portion of the remote-access authentication data.

17. The system of claim 15, wherein at least one server is operable to compute at least a portion of user related authentication information using at least one cryptographic function, based on at least one key.

18. The system of claim 15, wherein:
the one or more servers at the remote location comprise an IPSEC gateway;
the remote-access authentication data comprises IPSEC-related data; and
said IPSEC gateway being operable to authenticate the user comprises said IPSEC gateway being operable to verify the identity of the user using the IPSEC-related data.

19. The system of claim 15, wherein:
the one or more servers at the remote location comprise a firewall;
the remote-access authentication data comprises firewall-related data; and
said firewall being operable to authenticate the user comprises said firewall being operable to verify the identity of the user using the firewall-related data.

20. The system of claim 15, wherein:
wherein the one or more servers at the remote location comprise a server associated with operating system domain;
the remote-access authentication data comprises domain-access data; and
said server associated with the operating system domain being operable to authenticate the user comprises said server associated with the operating system domain being operable to verify the identity of the user using the domain-access data.

21. The system of claim 15, wherein the remote location comprises a corporate network with remote access capabilities.

22. The system of claim 15, wherein the communication network comprise a mobile network.

23. The system of claim 22, wherein the mobile network comprises a GPRS, EDGE, HSCSD and/or UMTS network.

24. A system for allowing a user to remotely access a remote location, comprising:
user equipment that comprises at least one processor;
a smart-card associated with the user equipment; and
wherein the user equipment is operable to:
receive local-access authentication data from the user;
authenticate the user based on the local-access authentication data;
activate the smart-card when the user is successfully authenticated using the local-access authentication data; and
in response to the user requesting remote access to the remote location, for each authentication request received from a server associated with the remote location:
obtain from the smart-card corresponding remote-access authentication data; and
send the remote-access authentication data to the server of the remote location; and wherein:
the remote-access authentication data is different from the local-access authentication data,
the remote-access authentication data is provided by the smart-card, once activated, without requiring additional user input, and
the user is granted access to the remote location over a communication network based on successful authentication of the user.

25. The system of claim 24, wherein the user equipment is operable to establish connectivity to the remote location over the communication network, the establishing comprising setting up plurality of communication layers.

26. The system of claim 24, wherein user equipment is operable to obtain or send remote-access authentication data to enable independently authenticating the user for each of the plurality of layers.

27. The system of claim 24, wherein user equipment is operable to:
sequentially construct each one of the plurality of layers; and
obtain and send for each one of the plurality of layers, respective remote-access authentication data to enable independently authenticating the user for said one of the plurality of layers.

28. The system of claim 24, wherein the user equipment or the smart-card is operable to compute at least a portion of the remote-access authentication data using at least one cryptographic function, based on at least one key.

29. The system of claim 24, wherein the smart-card is operable to generate and/or store a plurality of remote-access authentication data sets, wherein each of the plurality of remote-access authentication data sets corresponds to a particular authentication interaction.

30. The system of claim 29, wherein each authentication interaction is based on one or more of: particular authentication mechanism or algorithm, a particular communication layer, a particular type of a remote server, and a particular type of user identification information.

* * * * *